(12) United States Patent
Ellingsworth

(10) Patent No.: US 7,849,030 B2
(45) Date of Patent: Dec. 7, 2010

(54) METHOD AND SYSTEM FOR CLASSIFYING DOCUMENTS

(75) Inventor: Martin E. Ellingsworth, Petaluma, CA (US)

(73) Assignee: Hartford Fire Insurance Company, Hartford, CT (US)

( * ) Notice: Subject to any disclaimer, the term of this patent is extended or adjusted under 35 U.S.C. 154(b) by 643 days.

(21) Appl. No.: 11/443,760

(22) Filed: May 31, 2006

(65) Prior Publication Data

US 2007/0282824 A1    Dec. 6, 2007

(51) Int. Cl.
   G06F 15/18    (2006.01)
   G06E 1/00     (2006.01)
   G06E 3/00     (2006.01)
   G06G 7/00     (2006.01)

(52) U.S. Cl. ...................................... 706/20
(58) Field of Classification Search ............... 706/20
   See application file for complete search history.

(56) References Cited

U.S. PATENT DOCUMENTS

| | | | |
|---|---|---|---|
| 4,570,156 A | 2/1986 | Nicholas, Jr. | |
| 4,752,889 A | 6/1988 | Rappaport et al. | |
| 4,933,871 A | 6/1990 | DeSieno | |
| 5,138,695 A | 8/1992 | Means et al. | |
| 5,317,507 A | 5/1994 | Gallant | |
| 5,325,298 A | 6/1994 | Gallant | |
| 5,361,201 A | 11/1994 | Jost et al. | |
| 5,398,300 A | 3/1995 | Levey | |
| 5,471,627 A | 11/1995 | Means et al. | |
| 5,613,072 A | 3/1997 | Hammond et al. | |
| 5,619,709 A | 4/1997 | Caid et al. | |
| 5,663,025 A | 9/1997 | Ciccarelli et al. | |
| 5,712,984 A | 1/1998 | Hammond et al. | |
| 5,745,654 A | 4/1998 | Titan | |
| 5,745,854 A | 4/1998 | Schorman | |
| 5,794,178 A | 8/1998 | Caid et al. | |
| 5,819,226 A | 10/1998 | Gopinathan et al. | |
| 5,884,289 A | 3/1999 | Anderson et al. | |
| 5,918,208 A | 6/1999 | Javitt | |

(Continued)

OTHER PUBLICATIONS

Web Host Access Tool: A Support Vector Machine Approach, Banerjee, S.; Cassel, L.; Neural Networks, 2006. IJCNN '06. International Joint Conference on Digital Object Identifier: 10.1109/IJCNN.2006.246824 Publication Year: 2006 , pp. 1176-1183.*

(Continued)

*Primary Examiner*—Michael Holmes
(74) *Attorney, Agent, or Firm*—Buckley, Maschoff & Talwalkar LLC

(57) ABSTRACT

The invention provides a method and system for classifying insurance files for identification, sorting and efficient collection of subrogation claims. The invention determines whether an insurance claim has merit to warrant claim recovery efforts utilizing software code for partially describing a set of documents having unstructured and structured file data containing terms and phrases having contextual bases, code for transforming the terms and phrases, code for iterating a classification process to determine rules that best classify the set of documents based upon context, code for incorporating the rules into an induction and knowledge representation, thesauri taxonomies and text summarization to classify subrogation claims; code for calculating a base score and a concept vector to identify the selected claims that demonstrate a given probability of subrogation recovery.

31 Claims, 15 Drawing Sheets

U.S. PATENT DOCUMENTS

| | | |
|---|---|---|
| 6,223,164 B1 | 4/2001 | Seare et al. |
| 6,226,408 B1 | 5/2001 | Sirosh |
| 6,366,897 B1 | 4/2002 | Means et al. |
| 6,408,277 B1 | 6/2002 | Nelken |
| 6,430,539 B1 | 8/2002 | Lazarus et al. |
| 6,518,584 B1 | 2/2003 | Woodruff |
| 6,597,775 B2 | 7/2003 | Lawyer et al. |
| 6,691,136 B2 | 2/2004 | Lee et al. |
| 6,704,728 B1 | 3/2004 | Chang et al. |
| 6,711,561 B1 | 3/2004 | Chang et al. |
| 6,714,905 B1 | 3/2004 | Chang et al. |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,745,181 B1 | 6/2004 | Chang et al. |
| 6,839,682 B1 | 1/2005 | Blume et al. |
| 6,865,566 B2 | 3/2005 | Serrano-Morales et al. |
| 6,944,604 B1 | 9/2005 | Majoor |
| 2001/0011265 A1 | 8/2001 | Cuan et al. |
| 2001/0027457 A1 | 10/2001 | Yee |
| 2001/0037475 A1 | 11/2001 | Bradshaw et al. |
| 2001/0039594 A1 | 11/2001 | Park et al. |
| 2001/0044834 A1 | 11/2001 | Bradshaw et al. |
| 2001/0053986 A1 | 12/2001 | Dick |
| 2002/0004824 A1 | 1/2002 | Cuan et al. |
| 2002/0029154 A1 | 3/2002 | Majoor |
| 2002/0035562 A1 | 3/2002 | Roller et al. |
| 2002/0049691 A1 | 4/2002 | Majoor |
| 2002/0049697 A1 | 4/2002 | Nakano et al. |
| 2002/0049715 A1 | 4/2002 | Serrano-Morales et al. |
| 2002/0099649 A1 | 7/2002 | Lee et al. |
| 2002/0111833 A1 | 8/2002 | Dick |
| 2002/0116227 A1 | 8/2002 | Dick |
| 2002/0178275 A1 | 11/2002 | Hein et al. |
| 2002/0194131 A1 | 12/2002 | Dick |
| 2003/0037043 A1 | 2/2003 | Chang et al. |
| 2003/0088562 A1 | 5/2003 | Dillon et al. |
| 2003/0110249 A1 | 6/2003 | Buus et al. |
| 2003/0158751 A1 | 8/2003 | Suresh et al. |
| 2003/0163452 A1 | 8/2003 | Chang et al. |
| 2003/0167189 A1 | 9/2003 | Lutgen et al. |
| 2003/0212654 A1 | 11/2003 | Harper et al. |
| 2003/0220927 A1 | 11/2003 | Iverson et al. |
| 2004/0015479 A1 | 1/2004 | Meek et al. |
| 2004/0133603 A1 | 7/2004 | Chang et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0181441 A1 | 9/2004 | Fung et al. |
| 2004/0215634 A1 | 10/2004 | Wakefield et al. |
| 2004/0225653 A1 | 11/2004 | Nelken et al. |
| 2004/0254904 A1 | 12/2004 | Nelken et al. |
| 2005/0080804 A1 | 4/2005 | Bradshaw, Jr. et al. |
| 2005/0096950 A1 | 5/2005 | Caplan et al. |
| 2005/0160088 A1 | 7/2005 | Scallan et al. |
| 2005/0187913 A1 | 8/2005 | Nelken et al. |

OTHER PUBLICATIONS

Speaker identification for security systems using reinforcement-trained pRAM neural network architectures, Clarkson, T.G.; Christodoulou, C.C.; Yelin Guan; Gorse, D.; Romano-Critchley, D.A.; Taylor, J.G.; Systems, Man, and Cybernetics, Part C: Applications and Reviews, IEEE Transactions on vol. 31, Issue: 1 Publication Year: 2001 pp. 65-76.*

Recovering "lack of words" in text categorization for item banks, Nuntiyagul, A.; Cercone, N.; Naruedomkul, K.; Computer Software and Applications Conference, 2005. COMPSAC 2005. 29th Annual International vol. 2 Digital Object Identifier: 10.1109/COMPSAC. 2005.128 Publication Year: 2005, pp. 31-32 vol. 1.*

"SAS Boosts Fireman's Fund's Bottom Line by $20 to $30 Million", www.e-consultancy.com, Jul. 11, 2003, 3 pages.

"Data Mining for Dollars", www.insurancetech.com, Sep. 29, 2003, 3 pages.

Marty Ellingsworth, "Fireman's Fund Pursues Profits with SAS", www.dmreview.com, DM Review, Oct. 2003, 2 pages.

Martin Ellingsworth et al., "Text Mining Improves Business Intelligence and Predictive Modeling inInsurance", KeepMedia, Jul. 8, 2003, 4 pages.

Steve Dwyer, "Business Intelligence Helps Fireman's Fund Extinguish Fraud", www.insurancenetworking.com, Dec. 1, 2003, 4 pages.

"A Burning Quest for Intelligence—Fireman's Fund INsurance Company Pursues Profits with SAS", SAS Success Stories, Nov. 23, 2005, 6 pages.

Eric Krell, "5 Ways to Get More from Your CRM Investment", www.destinationcrm.com, Jun. 1, 2004, 3 pages.

Marty Ellingsworth, "Mining Tool Put Text Into Context", www.optimizemag.com, Oct. 2003, Issue 22, 2 pages.

Lisa Guernsey, "Digging for Nuggets of Wisdom", nytimes.com, Oct. 16, 2003, 4 pages.

"SAS Improves Fireman's Fund's Bottom Line", www.crm2day.com, Jul. 11, 2003, 2 pages.

Fabio Brugnara et al., "Techniques for Approximating A Trigram Language Model", IRST, Trento, Italy, 4 pages.

Chikashi Nobata et al., "Towards Automatic Acquisition of Patterns for Information Extraction", 6 pages.

Ralph Grishman, "Information Extraction: Techniques and Challenges", 18 pages.

Jimmy Lin "The Web as a Resource for Question Answering: Perspectives and Challenges", pp. 2120-2127.

Ellen Riloff et al., "Information Extraction as a Basis for High-Precision Text Classification", ACM Transactions on Information Systems, Jul. 1994, vol. 12, No. 3, pp. 1-36.

"Automated Insurance Subrogation Detection", A Fair Issac White Paper, Nov. 2002, 10 pgs.

Mats Gyllenberg et al., "Probabilistic Models for Bacterial Taxonomy", Tucs Technical Reports, No. 325, Jan. 2000, 48 pgs.

* cited by examiner

FIG. 2c

| Tab | Ref |
|---|---|
| Work Queue | 298a |
| Claim Detail | 298b |
| Search | 298c |
| Reports | 298d |
| Extract | 298e |
| Client View | 298f |
| Claim Batches | 298g |

Claim Detail (271)

- 271a Claim Number
- 271b Claimant Name
- 271c Client Number
- 271d Claim Type — Personal
- 271e Line of Business — Auto
- 271f Type of Coverage — Collision
- 271g Jurisdiction Type
- 272 Description — (Position for Case Narrative)

- 271h Date of Loss — 03/25/2004
- 271i Subro Score — 0
- 271j Subro Flag — 0
- 271k Subro Story — 11000
- 271l At Fault Story — 10000
- 271m Coverage State — Alabama
- 271n Claim Status — Closed
- 271p 271r Payment Summary / 271t Open / 271v Incurred

| | Loss Cause Payment | | Incurred |
|---|---|---|---|
| BI | $0.00 | | $0.00 |
| CG (271s) | $0.00 | | $0.00 |
| CL | $15,195.00 | | $0.00 |
| PD | $0.00 | | $0.00 |
| PM | $0.00 | | $0.00 |
| OT | $0.00 | | $0.00 |

Notes (284)

***INSD STATES THEY HAVE RR, DOES NOT SHOW ON CCV-CONTACTING AGENT NO EXCLUSIONS NO # PROVIDED FOR CMT, LOOKED ONLINE NO MATCH...SENDING CALL INCONTACT LETTER...RUNNING PLATE TO OBTAIN INSURANCE INFO. RECEIVE FAX FROM INSD...RECEIVE POLICE REPORT...OUR INSD WAS CITED.

REPORT STATES SGT. HAGGERTY WITNESSES THE FOLLOWING V1 WAS STOPPED FOR THE TRAFFIC LIGHT ON EAST MAIN STREET. V2 WAS TRAV. BEHIND V1 ADN WAS NOT PAYING ATTENTION V2 CONTINUED STRAIGHT INTO THE REAR END OF V1. V2 SUSTAINED HEAVY FRONT DAMAGE AND NEEDED TO BE TOWED FROM SCENE. V1

| Work Queue | Claim Detail | Search | Reports | Extract | Client View | Claim Batches |
|---|---|---|---|---|---|---|

Search

Client

Claim Type

Jurisdiction Type                    Score

Line of Business                     State

Type of Coverage

Type of Coverage

Claim Status

Text Searched "red Light" AND "rear end"    — 293

| Claim Number | Amount Paid | Subro Score | Subro Story | At Fault Diary | Loss Description |
|---|---|---|---|---|---|
| ▓▓▓ | $4,573.47 | 0 | 00000 | 10000 | IV DRIVING AND LOOKED DOWN TO LOOK AT SOME D |
| ▓▓▓ | $588.60 | 85 | 11000 | 10000 | IV REARENDED OV AT SET OF LIGHTS |
| ▓▓▓ | $1,649.46 | 0 | 00000 | 10000 | CV2 AND CV1 WERE BOTH STOPPED AT A RED LIGHT |
| ▓▓▓ | $748.42 | 0 | 00000 | 10000 | IV REARENDED BY UNKNOWN VEH WHO FLED SCENE |
| ▓▓▓ | $1,728.10 | 0 | 00000 | 10000 | BOTH VEH STOPPED IN TRAFFIC IV STARTED TO CHA |
| ▓▓▓ | $1,594.30 | 0 | 00000 | 10000 | CLMT REPORTS CLMT STOPPED IN TRAFFIC AT A RED |
| ▓▓▓ | $2,900.97 | 90 | 01000 | 10000 | IV OV1 OV2 OV3 TRAVELING NB ON ROUTE 3 EXIT |
| ▓▓▓ | $1,567.95 | 90 | 01000 | 10000 | IV TRANELING ON WILBRAHAM ROAD OV STOPPED IN |

FIG. 2d

- 401(a₁) N-Gram exact match on a word
- 401(a₂) N-Gram exact match on a phrase
- 401(b) Levenshtein on a word
- 401(c) Levenshtein match on a phrase
- 401(d) Boolean queries
- 401(e) Wildcard queries
- 401(f) Synonym matches
- 401(g) Support of soundex
- 401(h) Span queries
- 401(i) Range queries
- 401(j) Categorization based on word/phrase frequency
- 401(k) Parts of speech processing

FIG. 4a

|  | phrase | # IN SUBRO | 'REMAINS' | TOTAL | % IN SUBRO |
|---|---|---|---|---|---|
| 1 | IV HIT | 3663 |  |  |  |
| 2 | IV HIT BY | 9145 | 696 |  |  |
| 3 | IV HIT BY OV | 12808 | 1289 |  | 28.59931 |
| 4 | IV HIT BY AN UNKNOWN |  | 11 | 11 | 0 |
| 5 | IV HIT BY KNOWN OV | 14 | 2 | 16 | 87.5 |
| 6 | IV HIT BY OV BACKING | 9 | 1 | 10 | 90 |
| 7 | IV HIT BY OV IN | 21 | 10 | 31 | 67.74194 |
| 8 | IV HIT BY OV ON | 46 | 27 | 73 | 63.0137 |
| 9 | IV HIT BY OV OV | 17 | 7 | 24 | 70.83333 |
| 10 | IV HIT BY OV THAT | 17 | 1 | 18 | 94.44444 |
| 11 | IV HIT BY OV WHEN | 14 | 4 | 18 | 77.77778 |
| 12 | IV HIT BY OV WHICH | 8 | 2 | 10 | 80 |
| 13 | IV HIT BY OV WHILE | 89 | 22 | 111 | 80.18018 |
| 14 | IV HIT BY OV WHO | 31 | 7 | 38 | 81.57895 |
| 15 | IV HIT BY THE OV | 14 | 1 | 15 | 93.33333 |
| 16 | IV HIT BY UNK OV | 3 | 20 | 23 | 13.04348 |
| 17 | IV HIT BY UNK WHILE | 2 | 24 | 26 | 7.692308 |
| 18 | IV HIT BY UNKNOWN OV | 7 | 157 | 164 | 4.268293 |
| 19 | IV HIT BY UNKNOWN VEHICLE | 2 | 29 | 31 | 6.451613 |
| 20 | IV HIT BY UNKNOWN WHILE | 12 | 192 | 204 | 5.882353 |

FIG. 5

METHOD AND SYSTEM FOR CLASSIFYING DOCUMENTS

BACKGROUND OF THE INVENTION

1. Field of the Invention

This application is related to the field of data mining and text mining.

2. Description of the Prior Art

Data mining is a process for selecting, analyzing and modeling data generally found in structured forms and having determinative content. Text mining is a complementary process for modeling data generally found in unstructured forms and having contextual content. Combined systems treat both types of mining employing hybrid solutions for better-informed decisions. More particularly, document clustering and classification techniques based on these types of mining can provide an overview or identify a set of documents based upon criteria that amplifies or detects patterns within the content of a representative sample of documents.

One of the most serious problems in today's digital economy concerns the increasing volume of electronic media, (including but not limited to: documents databases, emails, letters, files, etc.) many containing non-structured data. Non-structured data presents a semantic problem in identifying meaning and relationships especially where a group of documents contain a certain class of information expressed in non-equivalent ways. A claim, whether financial, legal, fraud or insurance claim file is but one of several types of files that contain information in a certain class, but that may be expressed in non-equivalent ways. Assessing insurance subrogation claims manually requires a significant expenditure of time and labor. At least part of the inefficiency stems from the volume of documents, the use of non-standard reporting systems, the use of unstructured data in describing information about the claim, and the use of varying terms to describe like events.

Improving the automated assessment of claims through improved recognition of the meaning in the unstructured data is targeting the use of conventional search engine technology (e.g. using parameterized Boolean query logic operations such as "AND," "OR" and "NOT"). In some instances a user can train an expert system to use Boolean logical operators to recognize key word patterns or combinations. However, these technologies have proved inadequate for sorting insurance and fraud claims into classes of collection potential when used solely. Other approaches have developed ontologies and taxonomies that assist in recognizing patterns in language. The World Wide Web Consortium (W3C) Web Ontology Language OWL is an example of a semantic markup language for publishing and sharing ontologies on the World Wide Web. These approaches develop structured informal descriptions of language constructs and serve users who need to construct ontologies. Therefore, a need exists for an automated process for screening commercial files for purposes of classifying them into a range of outcomes utilizing a wide range of techniques to improve commercial viability.

SUMMARY OF THE INVENTION

The present invention pertains to a computer method and system for identifying and classifying structured and unstructured electronic documents that contain a class of information expressed in non-equivalent ways. In one embodiment of the invention a process creates the rules for identifying and classifying a set of documents relative to their saliency to an claim, whether financial, legal, fraud or insurance claim. The steps for identifying and classifying are accomplished by using one or more learning processes, such as an N-Gram processor, a Levenshtein algorithm or a Naïve Bayes decision making logic. These and other classifying processes determine a class based upon whether a case file uses concepts related to terms and their equivalents or synonyms and to a score related to the frequency and relevancy of appearance of certain terms and phrases.

The invention also provides a method for processing a set of documents and highlighting features, concepts and terms for new classification models. The method is tested and new experience or learning is fed back via added, modified or removed terms until the classification of the documents converge to a prescribed level of accuracy. For each new set of documents the invention first models a data set of features, concepts and terms to find rules and then checks how well the rules identify or classify documents within the same class of collected cases.

BRIEF DESCRIPTION OF THE DRAWINGS

The invention is best understood from the following detailed description when read in connection with the accompanying drawing. The various features of the drawings are not specified exhaustively. On the contrary, the various features may be arbitrarily expanded or reduced for clarity. Included in the drawing are the following figures:

FIG. 2c illustrates a graphical user interface having an imbedded file illustrating one embodiment of the present invention;

FIG. 2d illustrates a graphical user interface having an imbedded file illustrating one embodiment of the present invention;

FIG. 4a shows a number of recognition methods utilized in the present invention;

FIG. 5 is a chart of an N-Gram process outcome of the present invention;

DETAILED DESCRIPTION OF EMBODIMENTS OF THE INVENTION

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present method or apparatus of the present invention is embodied in a digital process.

Figure 1:
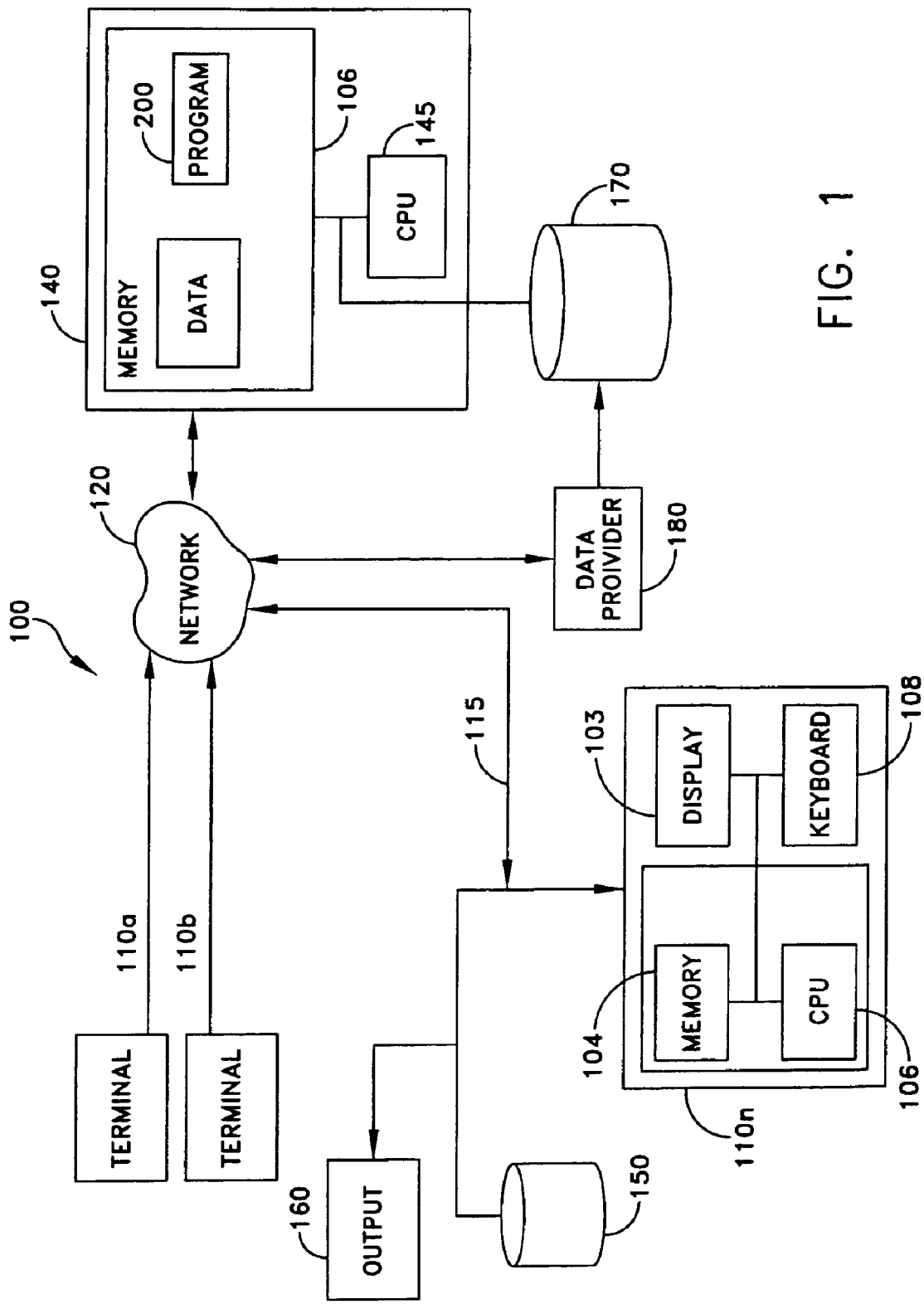
FIG. 1 is a block diagram illustrating a system for identifying and classifying documents that contain a class of information expressed in non-equivalent ways according to an embodiment of the invention.

The invention herein is used when the information contained in a document needs to be processed by applications, as opposed to where the content only needs to be presented to humans. The apparatus, method and system herein is used to represent the meaning of terms in vocabularies and the relationships between those terms. FIG. 1 illustrates an exemplary embodiment of a computing system 100 that may be used for implementing an embodiment of the present invention. Other computing systems may also be used. System 100 identifies, classifies and generates a score representing the probability for collecting a claim, whether financial, legal, fraud or insurance claim by: (a) analyzing representative files for associated concepts, phrases and terms; (b) creating a lexicon of associated concepts, phrases and terms; (c) collecting information from files having associated file phrases and terms; (d) identifying file phrases and terms present in the lexicon; (e) determining the pursuit potential and/or the cost of collection against the score derived from the accumulation of terms and phrases present in a file; and (f) automatically routing a file for pursuit of collection.

In general, system 100 includes a network, such as a local area network (LAN) of terminals or workstations, database file servers, input devices (such as keyboards and document scanners) and output devices configured by software (processor executable code), hardware, firmware, and/or combinations thereof, for accumulating, processing, administering and analyzing the potential for collecting an insurance claim in an automated workflow environment. The system provides for off-line and/or on-line identification, classification and generation of a score of the potential for collecting a claim. This advantageously results in an increase income to the owner of the claim and reduction in financial losses.

While a LAN is shown in the illustrated system 100, the invention may be implemented in a system of computer units communicatively coupled to one another over various types of networks, such as a wide area networks and the global interconnection of computers and computer networks commonly referred to as the Internet. Such a network may typically include one or more microprocessor based computing devices, such as computer (PC) workstations, as well as servers. "Computer", as referred to herein, generally refers to a general purpose computing device that includes a processor. "Processor", as used herein, refers generally to a computing device including a Central Processing Unit (CPU), such as a microprocessor. A CPU generally includes an arithmetic logic unit (ALU), which performs arithmetic and logical operations, and a control unit, which extracts instructions (e.g., software, programs or code) from memory and decodes and executes them, calling on the ALU when necessary. "Memory", as used herein, refers to one or more devices capable of storing data, such as in the form of chips, tapes, disks or drives. Memory may take the form of one or more media drives, random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory may be internal or external to an integrated unit including a computer.

"Server", as used herein, generally refers to a computer or device communicatively coupled to a network that manages network resources. For example, a file server is a computer and storage device dedicated to storing files, while a database server is a computer system that processes database queries. A server may refer to a discrete computing device, or may refer to the program that is managing resources rather than an entire computer.

Referring still to FIG. 1, system 100 includes one or more terminals 110a, 110b, . . . , 110n. Each terminal 110 has a processor, such as CPU 106, a display 103 and memory 104. Terminals 110 include code operable by the CPU 106 for inputting a claim, whether financial, legal, fraud or insurance claim and for recognizing favorable claim files. Terminals 110 also include code operable to create patterns of concepts and terms from the files and to manage the files. A server 150 is interconnected to the terminals 110 for storing data pertinent to a claim. User input device(s) 108 for receiving input into each terminal are also provided.

An output device 160, such as a printer or electronic document formatter, such as a portable document format generator, for producing documents, such as hard copy and/or soft copy lists of collection potential claims, including at least one of text and graphics, being interconnected and responsive to each of the terminals 110, is also provided. In one embodiment, output device 160 represents one or more output devices, such as printers, facsimile machines, photocopiers, etc., as for example used to generate hard copy of a claim, whether financial, legal, fraud or insurance claim, document.

Communications channels 115, that may be of wired and/or wireless type, provide interconnectivity between terminals 110, server 150 and one or more networks 120, that may in-turn be communicatively coupled to the Internet, a wide area network, a metropolitan area network, a local area network, a terrestrial broadcast system, a cable network, a satellite network, a wireless network, or a telephone network, as well as portions or combinations of these and other types of networks (all herein referred to variously as a network or the Internet).

In one non limiting embodiment of system 100, other servers 140 having a CPU 145 for identifying, classifying and generating a score of the potential for pursuing collecting a claim may be in communication with network 120 and terminals 110. As will be recognized by those skilled in the art of networking computers, some or all of the functionality of analyzing the term claims, and/or managing claim files may reside on one or more of the terminals 110 or the server 140.

Security measures may be used in connection with network transmissions of information, to protect the same from unauthorized access. Such secure networks and methodologies are well known to those skilled in the art of computer and network programming.

Figure 2A:
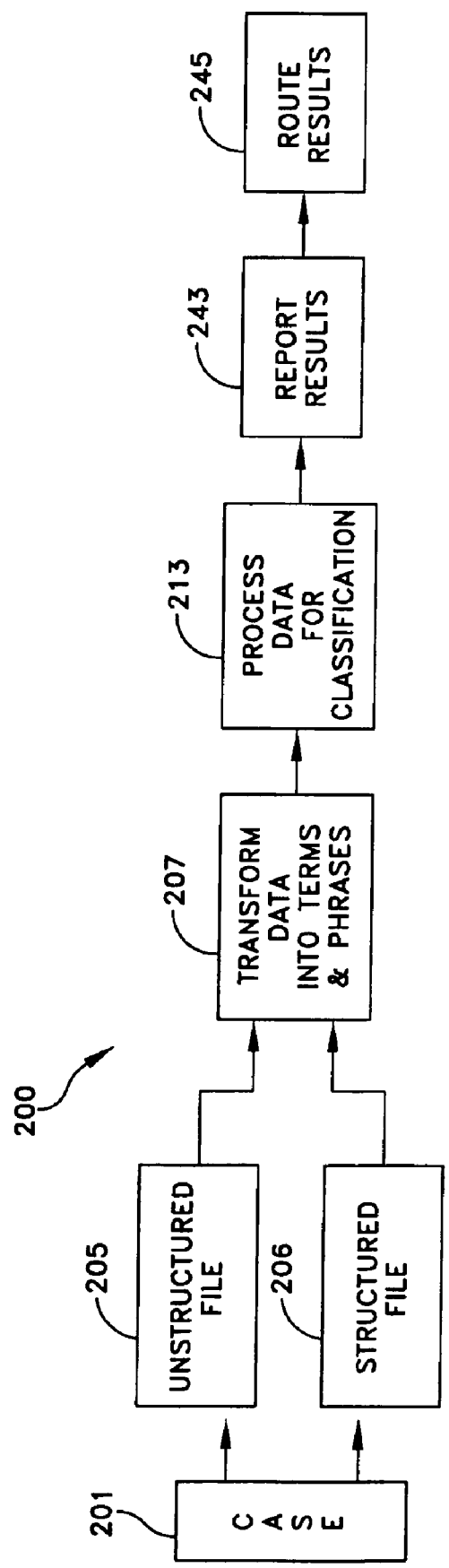
FIG. 2a is a block diagram and a flow chart of a method of operation of one embodiment of the invention.
Figure 2B:
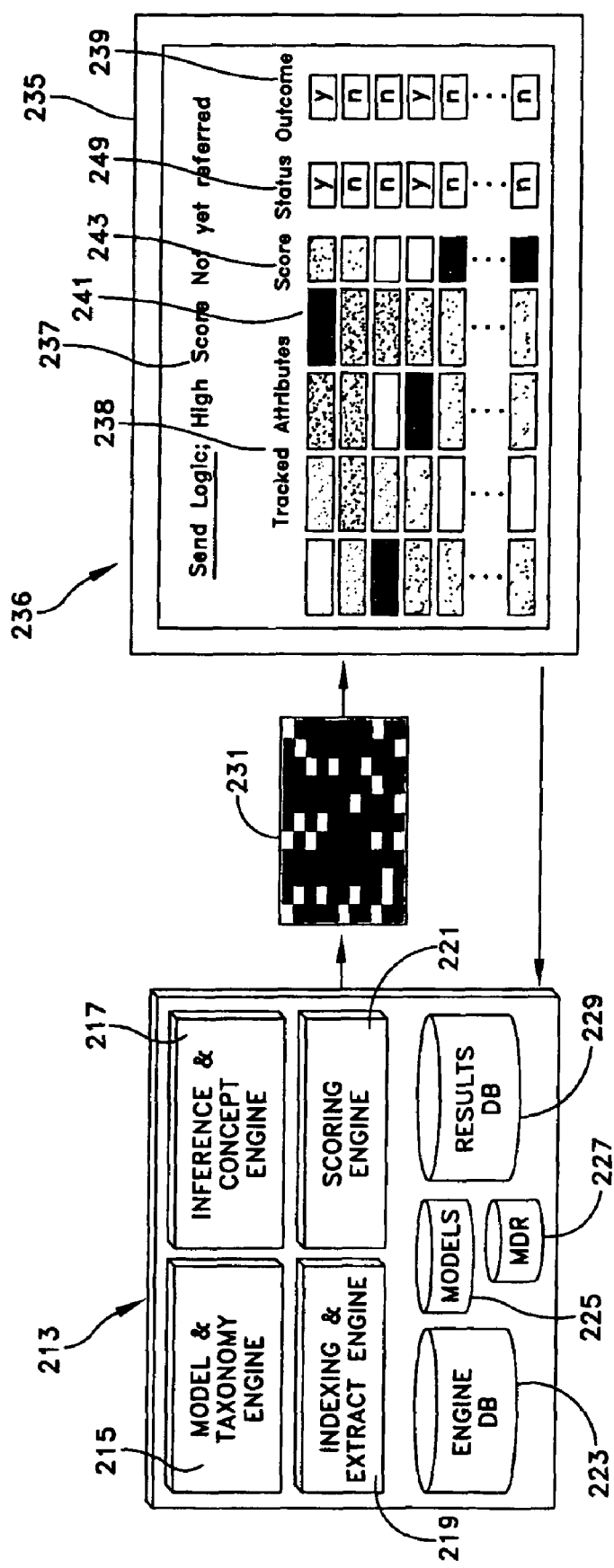
FIG. 2b illustrates a block diagram of the classification processor illustrating one embodiment of the invention.

In the illustrated embodiment of system 100, server 140 and terminals 110 are communicatively coupled with server 170 to store information related to claims and other data relating to collection and managing claims based upon the underlying contract provisions. As will be discussed below in connection with one embodiment of the invention database servers 150 and 170 each may store, among other items, concept and term data, index data, data signifying collection potentials and corresponding dollar amounts. Server 140 may house and/or execute a taxonomy engine 215 (FIG. 2*b*) and/or inference and engine 217 and associated database system 223 (FIG. 2*b*). Also available to terminals 110, and stored in databases servers 150 and 170 databases, are event data associated with corresponding subrogation statutes and jurisdictional rules associated with various types of event provision coverages. Database connectivity, such as connectivity with server 170, may be provided by a data provider 180.

In one embodiment, terminals 110 and/or server 140 utilize computer code, such as code 200 operable and embodied in a computer readable medium in server 140 and code operable and embodied in a computer readable medium 104 in terminal 110, respectively, for improving collections or mitigating financial loss from potentials associated with claim collections or non-collections.

The computer code provides: for establishing at least one database, such as at server 150 and/or server 170; for storing the collection potentials; for creating concept and term data, index data, data signifying collection potentials and corresponding dollar amounts; for storing data indicative of the plurality of claim files likely to be collected upon in server 150 and/or server 170; for storing data indicative of a plurality of claim events, each being associated with a corresponding one of the claim files, in server 150 and/or server 170; for storing data indicative of time-frames, within which written notices regarding a claim, whether financial, legal, fraud or insurance claim or other legal actions must be prosecuted or delivered dependently upon the data indicative of the events; for automatically generating at least one electronic message (e.g., reports, batch files, email, fax, Instant Messaging); for comparing event terms against similar or equivalent event terms having associated collection potentials statistics; and for utilizing the collection potential statistics and corresponding policies insuring against losses resulting from non collection of claims. Other hardware configurations may be used in place of, or in combination with firmware or software code to implement an embodiment of the invention. For example, the elements illustrated herein may also be implemented as discrete hardware elements. As would be appreciated, terminals 110*a*, 110*b*, ..., 110*n* and server 140 may be embodied in such means as a general purpose or special purpose computing system, or may be a hardware configuration, such as a dedicated logic circuit, integrated circuit, Programmable Array Logic (PAL), Application Specific Integrated Circuit (ASIC), that provides known outputs in response to known inputs FIG. 2*a* represents a process 200 used for determining whether any claim, whether financial, legal, fraud or insurance claim should be classified for possible claim recovery. The process 200 employs the computer system 100 to determine whether an insurance claim has merit to warrant claim recovery by: describing a set of insurance file documents 205, 206 which are part of an insurance case 201, having data containing a subrogation insurance context, iterating upon a classification process to create rules that classify the set of documents 205, 206 based upon the context, and incorporating the rules into classification schema to classify the claims; wherein the schema calculates a score and a concept vector to identify the claims that demonstrate a threshold probability for recovery.

Although for purposes of describing the invention herein documents will be referred to as structured or unstructured, four types of information format exist in the non-limiting example used through this description as a subrogation insurance case 201. In the first instance, information may have a fixed format, where the content within the fixed format is determinative, such as a date field where the date found in the field is the determined content. In a second instance information may have a fixed format, where the content within the fixed format is not determined, but interpreted dependent on the context and language used, such as a field for a brief explanation of an accident and where the description found in the field is the variable content such as "Insured was hit head on". In a third instance information may have an unfixed format, where the content within the unfixed format is determined, such as where the content may indicate, "... statute of limitations expired". Finally in the fourth instance information may have an unfixed format, where the content within the fixed format is not determined, but interpreted dependent on the context and language used, such as a narrative explanation of an accident. The invention herein deals with all four types of structured and unstructured information and formats in determining the potential for subrogation recovery. To achieve the final result, the invention reduces the structured data to elements that may have determinative value and failing to determine potential subrogation recovery, the unstructured content is analyzed to create words and phrases that serve as data that provide probabilities of potential subrogation recovery. To this end, server 150, 170 databases store groups or lists of synonyms each associated with a single concept drawn from the field of insurance underwriting, coverage, liability and claims. In terms of the present invention concepts form into elements in a list or a vector. Many synonyms may relate to a single concept. A subrogation file's list synonyms are processed to determine whether the subrogation file contains the stored concept element; and if the subrogation file contains the concept element the occurrence is flagged for further processing as described below with reference to FIG. 7.

By way of explanation and not limitation, process 200 may be representative of a subrogation claim recovery application. One such subrogation application is the classification of un-referred or open cases that an insurance company has set aside during an early screening process. These un-referred cases are typically those that an insurance company may set aside while it deals with high economic return cases. One objective of the process 200 is to classify open case claims based on the potential to earn income on recovery of an outstanding insurance subrogation claim. Retrieving a case begins with a possible partial problem description and through an iterative process determines rules that best classify a set of open cases. A user of computer system 100 creates or identifies a set of relevant problem descriptors (such as by using keyboard 108), which will match the case 201 under review and thereafter return a set of sufficiently similar cases. The user iterates to capture more cases 201 each having greater precision until satisfied with a chosen level of precision. Essentially, when problem descriptors chosen in the early phase of the creation of the rules do not subsequently identify newer known subrogation case 201 opportunities, then the user researches the new cases for terms, words and phrases that if used as parameters to new or modified rules would identify a larger number of cases having similar terms, words and phrases.

Referring again to FIG. 2*a* and FIG. 2*b*, a user of process 200 obtains a subrogation case 201 having an unstructured file 205 and a structured file 206 and transforms the terms and phrases, within the files into data and loads data into central decision making functions 213 that includes taxonomy engine 215 and/or inference and concepts engine 217. A structured file is one where information is formatted and found in defined fields within a document. An unstructured file is one where information is not related to any particular format, such as occurs in a written narrative. The taxonomy engine 215 and/or the inference and concept engine 217 databases 223 and the search and indexing engine 219 databases may be independent or may be incorporated into databases, such as database server 150 database and/or database server 170 database as previously described. The process 200 utilizes several methodologies typically resident within the taxonomy engine 215 and/or inference and concepts engine 217 as drawn from (a) artificial intelligence, specifically rule induction and knowledge representation, (b) information management and retrieval specifically thesauri and taxonomies and (c) text mining specifically text summarization, information retrieval, and rules derived from the text to classify subrogation claims. A thesaurus as used herein refers to a compilation of synonyms, often including related and contrasting words and antonyms. Additionally herein, it may represent a compilation of selected words or concepts, such as a specialized vocabulary of a particular field, as by way of example and not limitation, such as finance, insurance, insurance subrogation or liability law.

With reference to FIG. 2a and FIG. 2b one or more of these classification systems such as embodied in (a) model and taxonomy engine 215 utilizing an associated models database system 225 and taxonomy database 223 system respectively and (b) inference and concept engine 217 utilizing an associated database 223 system and (c) search and indexing engine 219 utilizing an associated database 223 system provide input to a scoring engine 221 and associated database system 227 that calculates a score to identify selected claims that demonstrate at least a given probability of subrogation recovery. The process 200 generates reports such as report 236 that indicates: (a) tracked attribute 238, in the form of features 241, such as words and phrases denoting for example, which vehicle was hit, or who was injured, (b) a corresponding calculated score 243 particular to the subrogation claim file 201 as composed of the unstructured file 205 and the structured file 206; (c) a status of the file 249 and (d) whether this file has produced any outcomes 239. The report 236 is then stored in an archive database 229 and routed 245 to communicate the results to a list of recipients. Routing for example may include a litigation department, a collection specialist, a subrogation specialist, or a case manager, etc.

Process 200 (FIG. 2a) operates under the assumption that the user of the process 200 knows the features of interest and creates specific criteria to (1) improve 'hit rates' and (2) to overcome inaccuracies in data or (3) in the discussion of facts and allegations over the 'life of the claim' [e.g. they ran red light and hit us, then police report states otherwise . . . ] The user gathers situations for claim occurrences from: 1) published claim training materials; 2) experts in the field; 3) public data sources; 4) data driven client specific analyses; and 5) experience of the provider of the ultimate output. Theories of liability such as generalized through tort law and legislation determine the scope of the situations for subrogation opportunities. System 200 isolates each situation in a claim with subrogation opportunity and then screens for claims having selected features. The technique relies on the extraction and transformation 207 of data to support filling in the taxonomy. For example the system 200 has been programmed to 1) search a particular file and record therein for specific information that may be contained in the file. To achieve these objectives requires that the user of the process 200: (1) extract knowledge of a particular claims administration system such as data tables inside of the claims administration system and its unique code values; 2) have knowledge of how the business subrogation process works; 3) must use sources of text notes that may be supplied through annotation software; 4) and have a working knowledge of other systems and supporting documentation.

A transformation 207 creates a claim file providing an opportunity for human analysis wherein the process 200 allows for manually classifying files into 3 groups: (a) researching files that have actual subrogation collection potential, (b) researching files with no potential, (c) establishing an uncertainty group or 'don't know' pile for reports where information is incomplete, ambiguous or requires further consultation with claim specialists. The process 200 also describes the information in the claim file to carry out the following steps; 1) reverse engineering successful recoveries utilizing actual data; 2) annotating the important features of referrals to subrogation as well as referrals which never made a collection; 3) observing reasons for which a likely case previously had not been referred for collection; 4) creating rule bases for classifying cases; 5) testing and validating rules; 6) collecting feedback and making improvements to models, features or rules.

Additionally the manual process may add pertinent information to process 200 such as statistical data and tables and client documentation practices (research on their operations: 1) e.g., does client track files referred to subrogation; 2) e.g., does client track files already in subrogation: a) financial reserve transaction(s); 3) does client track final negotiated percent of liability; 4) does client have documentation standards/practices; 5) how does client document the accident, claimants, coverages, and other parties involved in assessing liability. Additional factors include mapping specific legal situations by jurisdiction (coverages allowed, thresholds applied, statues of limitation); and knowledge of insurance and subrogation. Some cases or situations have no subrogation potential, some are ambiguous, and some have high potential for recovery (the 'yes/no/don't know' approach). Similarly, informational features include any natural circumstance, which can occur when dealing with discourses related to an accident.

The classification of subrogation files is a two phase process, including a phase where a representative set of subrogation case files similar to subrogation case file 201 serves as test cases for establishing the parameters and rules, by which during a production phase a plurality of subrogation case files will be examined for collectability. Each phase may employ similar processes in preparing the data for its intended use. In FIG. 2c graphical user interface ("GUI") 290 aids in the preparation of a subrogation case 201 for analysis. The GUI 290 includes various user screens for displaying a work queue 298a where files are routed to the client, ready for its review; showing claim details 298b; a search 298c screen for conducting searches of cases having similar information; displaying reports 298d of cases in various stages of analysis; providing extract 298e of case files 201; a screen for client view 298f, and a screen for illustrating claim batches 298g.

The subrogation case 201 comprises the structured file record 206 and the unstructured file record 205 data from both of which displayed jointly in various fields in the graphical user interface 290. Each record contains information in the form of aggregate notes and other information, together, which represent one or more insurance subrogation claims. Subrogation case 201 file 205 and file 206 are converted by either an automatic operation such as optical character recognition, or a manual operation by a user into an electronic claim file data via terminals 110a, 110b, . . . , 110n, which is received by server 140 as represented in computer system 100. In the first phase, the electronic claim file is used to construct rules to automatically identify later documents having features previously incorporated in the rules.

Referring again to FIG. 2c wherein an insurance carrier's digitized subrogation case 201 electronic record is comprised of both unstructured data files 205 and structured data files 206 as shown in FIG. 2a as well as statistical data and tables acquired from a user such as an insurance carrier. Insurance carrier data is alternatively provided via email, data warehouses, special standalone applications and data from note repositories. As indicated, the process 200 FIG. 2a, also has the capability for obtaining electronic records by way of example and not limitation, from other claim systems, other data bases, electronic files, faxes, pdf's, and OCR documents. The structured file 206 data represents coded information such as date, time, Standard Industrial Codes or SIC codes, the industry standard codes and/or client or company specific standards indicating cause of loss, amounts paid and amounts reserved in connection with the claim. The unstructured file 205 data include aggregate notes, and terms and phrases relevant to an insurance subrogation claim, such as for example reporting whether in insured vehicle hit the other vehicle, or whether the other vehicle was rear-ended. The process exploits explicit documentation on statistical data and tables, liability and subrogation to winnow out salient files.

By way of example and not limitation, the file 205 data as imbedded in the graphical user interface 290 in FIG. 2c includes structured information related to claim details 299 such relates to a particular claim number 271a, claimant name 271b, client name 271c, claim type 271d, insurance line of business 271e, type of insurance coverage 271f, jurisdiction type 271g, where peculiarities of a jurisdiction such as a no-fault, contributory or comparative negligence law may apply. Additionally other fields indicate date of loss 271h, a subro score 271l, which indicates a measure of the potential for collection a subrogation claim, a subro flag 271j, a subro story 271k binary code that indicates what if any concepts were located for the particular file; an At Fault Story 271m a binary code that indicates what if any fault concepts were located for the particular file, the coverage state 271n and the claim status 271p. A payment summary 271r provides a quick view of payments made to date as a consequence of the accident that gave rise to the subrogation case. Incurred 271v relates to amounts paid when dealing with open claims versus closed claims. The loss cause payment 271s relates to the various kinds of loss payments where for example BI denotes bodily injury and CL indicates that dollars were paid for collision coverage. Other codes CG, PD, PM and OT may be codes related to an insurance companies nomenclature for characterizing the kind of payment. Whether a payment remains open 271t is a field that indicates whether further payments may be forthcoming. A narrative notes 284 section provides the unstructured information, which formed the basis for part of the unstructured data analysis used by various classification routines, such as N-Gram analysis that look for patterns of word or term associations (the definition of terms and words are equivalent throughout this disclosure).

FIG. 2d illustrates the GUI 290 search screen where search terms 288 are applied to a search engine as installed in server 140 for searching subrogation cases 201 that have the search terms in common. In the example depicted by FIG. 2d, eight files were found with the search terms "red light" and "rear end". Each file indicates a corresponding loss description 293 and as indicated in connection with FIG. 2c, varying amounts paid, a Subro Score, a Subro Story and an At Fault Story.

Figure 2E:
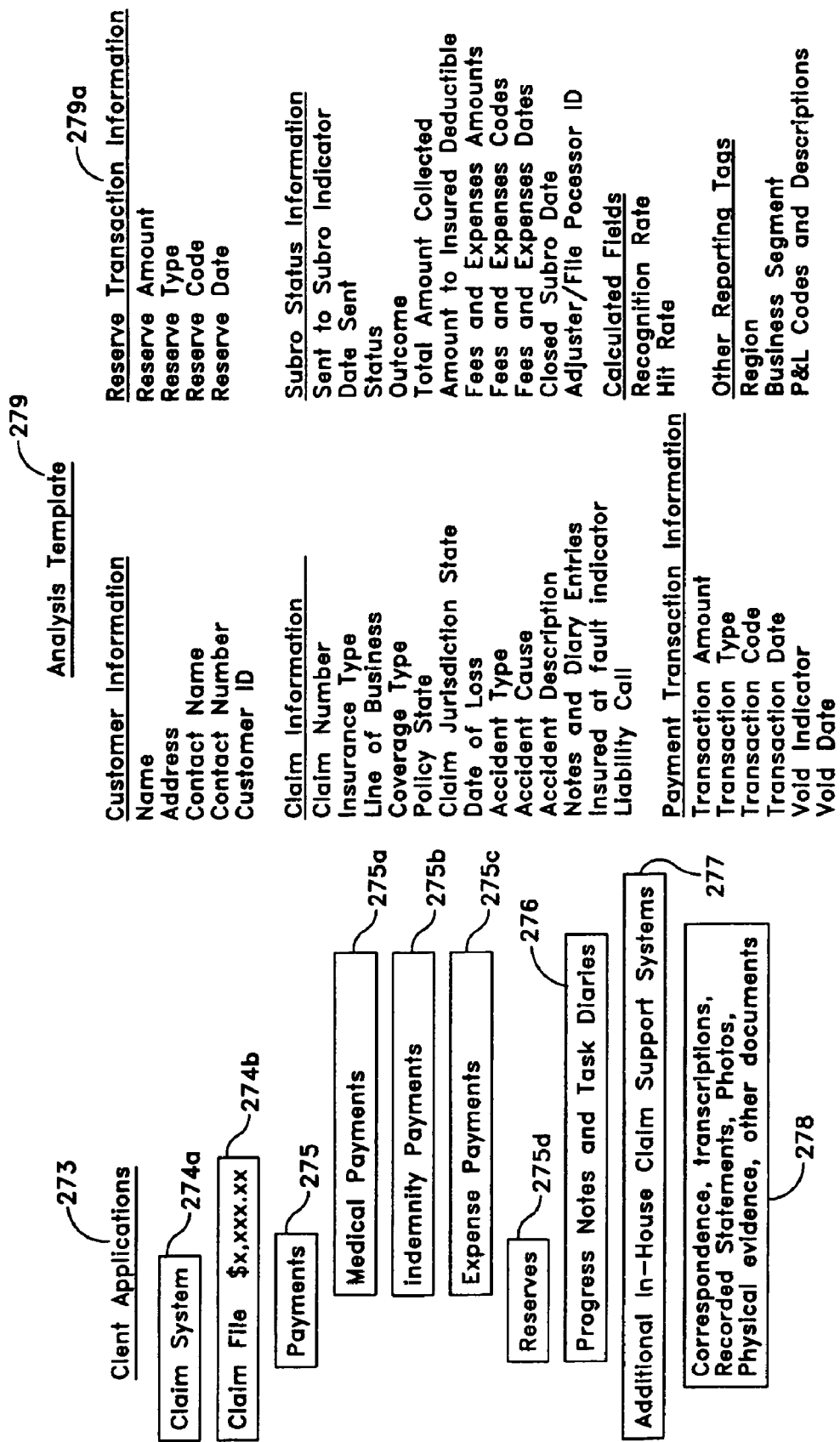
FIG. 2e illustrates a data format of a template of one embodiment of the present invention.

As illustrated in FIG. 2e a user selects the data from the subrogation case 201 and maps statistical client data as available into template 273 and template 279. Such client data may be indicative of a certain claim system 274a and file number 274b, a payments box 275 of payments made relative to the file under examination, such as medical payments 275a, indemnity payments 275b, and expense payments 275c, amounts reserved 275d, progress notes and task diaries 276; additional in-house claim support systems 277; correspondence, transcriptions, recorded statements, photos, physical evidence and other related documents 278. Other information 279a may be mapped into a template 279 based upon discussions with a client or its representative, such as data engineers, system historians and other insurance subrogation professionals. Although the notion of a template is general, specifically each template and associated data mapping is unique to a client, which creates case files according to their individual business requirements.

Figure 2F:
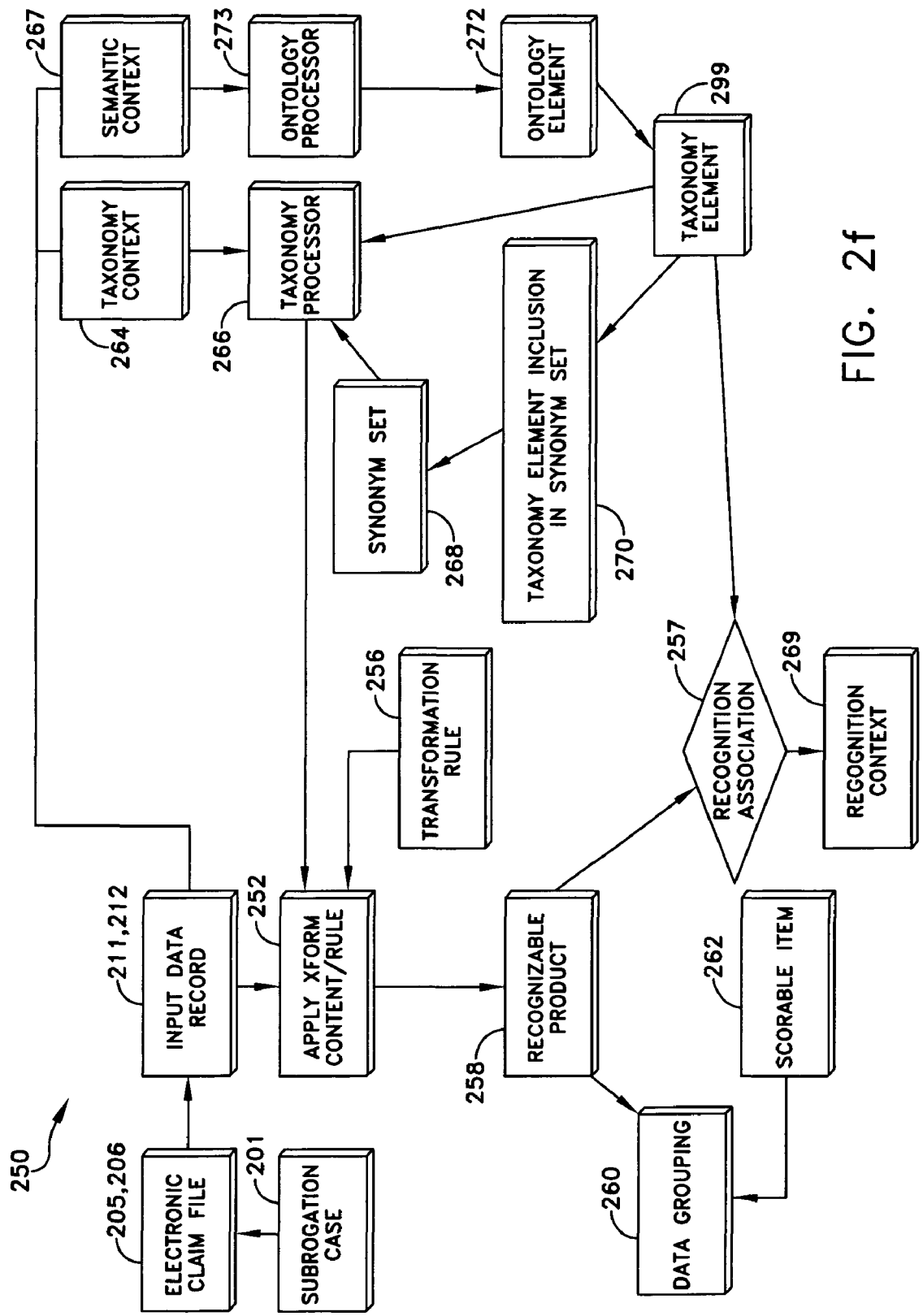
FIG. 2f is a data model embodiment of the invention illustrating relationships used in identifying and recognizing, translating and scoring structured and unstructured data, utilizing forms of taxonomies and ontologies.

Process 200 utilizes the data model 250 shown in FIG. 2f in creating the process and structure for analyzing the subrogation case 201. Likewise, FIG. 2b central decision making functions 213 incorporate the data model 250 into functions performed by the taxonomy engine 215, inference and concepts engine 217, and the scoring engine 221 as previously described. Data model 250 functions to identify, recognize, translate and score structured and unstructured data.

The model 250 is used in two different modes. A first mode utilizes structured and unstructured data to create the model. A second mode uses the parameters established for the model 250 in the first mode to classify documents. In the first mode, two types of information are utilized: (a) information representing encyclopedic like reference material, such as statutes of limitation, jurisdiction, laws of negligence, insurance laws; and (2) information representing words and phrases from archetypical subrogation files. The archetypical subrogation files 201 have similar data structure to the cases to be subsequently automatically analyzed. The information, 1,2 above is used to essentially create the data model 250 by forming the taxonomic and ontologic dictionaries, hierarchies and relationships as well as transformation rules that later classify unknown files from a similar domain, within established levels of accuracy as having relative degrees of collection potential.

Referring to FIG. 2f, case files 205 having unstructured file 205 and structured file 206 are transformed into electronic records 211, 212. Data from 211, 212 are inputted to a taxonomy context process 264 which organizes the context within which a taxonomy (i.e. a set of terms/representations, and their associated meaning) is deemed relevant. For example, a specific set of abbreviations may be recognized and often pervasive in communications among and with claims adjusters or health care providers. These abbreviations might be irrelevant or not comprehensible outside of the insurance or health care fields. Taxonomy element 271 denotes a taxonomy reference to a field value, string, or number that if found in a data record may be of interest. A taxonomy element 271 "inclusion in synonym set" 270 denotes the inclusion of a specific taxonomy element in a synonym set 268. The set of taxonomy elements 271 that are included within a single synonym set 268 are considered to mean the same thing within the same taxonomy context. The synonyms or terms developed are each associated each with a single domain concept. Synonym set 268 therefore refers to a set of taxonomy elements 271 that within a specific context are considered equivalent. For example, a synonym set 268 could include: "San Francisco", "SF", "S.F.", "San Fran". Taxonomy element 271, the data taxonomy context 264 associated with the data record element, the synonym set 268 are inputted into a taxonomy processor 266 to form a taxonomy against which subsequent case 201 taxonomic data will be compared.

Transformation 252 refers to the context (configuration, source context, etc.) within which a transformation rule 256 and input data 211, 212 is performed. This includes the set of taxonomy elements used for matching against, and the set of formatting, translation, and organization rules used to make the transformation. Transformation 252 applies the rules 256 to translate the input data records 211, 212 to recognizable items 258. Recognizable item 258 is any part of an input data record (e.g., a field, a character string or number within a field, or a set of fields, and/or character strings and/or numbers within fields) that has been determined through the inspection of records to be recognizable. If a recognizable item 258 is compound, that is consists of more than one field, character string and/or number, it need not necessarily be contiguous within a file or record, although it must be within a specified range relative to the input data record 211, 212. A recognizable item 258 could be recognizable in more than one recognition contexts. For example, the same string may be considered a recognizable item for fraud analysis as for subrogation recovery analysis.

As earlier indicated, the apparatus, method and system herein is used to represent the meaning of terms in vocabularies and the relationships between those terms. This representation of terms and their interrelationships is called ontology. Ontology generally refers to a set of well-founded constructs and relationships (concepts, relationships among concepts, and terminology), that can be used to understand and share information within a domain (a domain is for example the insurance field, fraud investigation or a subclass such a subrogation claim). The concepts, terminology and relationships of an ontology are relevant within a specific semantic context 267. Data from 211, 212 are inputted to semantic context 267, which organizes the context relevant to ontology process 273. Essentially ontology process 273 formalizes a domain by defining classes and properties of those classes. Ontology element 272 refers to a concept or a relationship within an ontology so as to assert properties about them. Ontology element 272 and ontology process 273 therefore combine to provide a structure for additional concept discovery over the data residing in the case 201. Ontology element 272 additionally provides a semantic context for taxonomy element 271.

Data grouping 260 refers to a grouping of recognizable items within a scorable item 262. For example, there may be a data grouping for "scene-of-the-accident" descriptions within a claim 201 scorable item 262. Data grouping 260 is similar to recognizable item 258, but represents a high level "container" that allows one or more groupings or patterns of recognizable items 258 to be aggregated for scoring. Scorable item 262 refers to an item, such as found in subrogation case 201, for which scoring can be tallied, and for which referral is a possibility. What is or is not deemed a scorable item 262 is based upon various tests or scoring rules that include factors to consider and what weighting to apply in computing a score for a scorable item. A recognition context 269 joins 257 the recognizable item 258 and the taxonomy element 271 to evaluate the set of recognizable items 258 in context.

Figure 3:
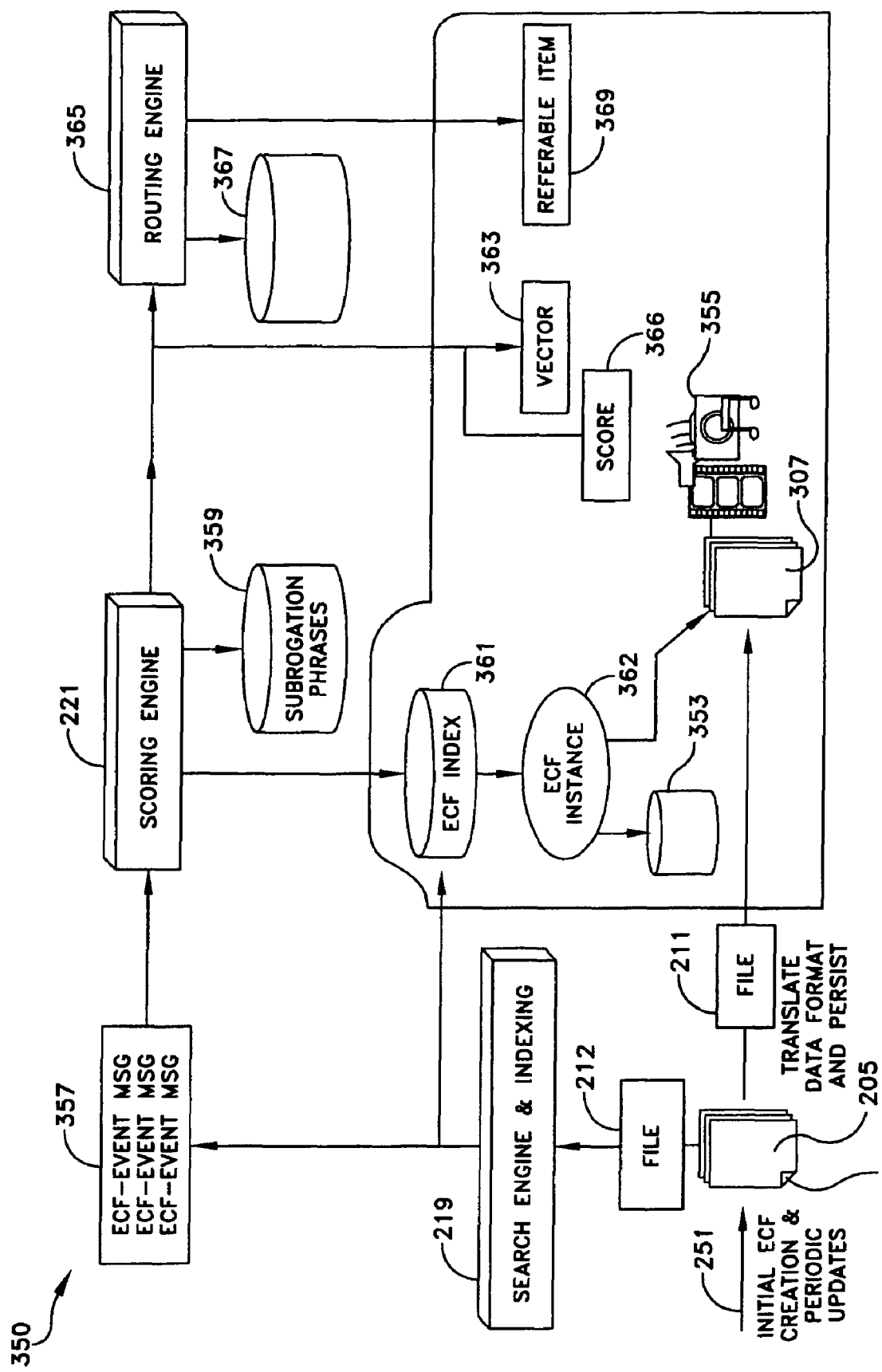
FIG. 3 is a block diagram of a system illustrating one embodiment of the present invention.

Referring now to FIG. 3, one embodiment of the present invention is a system 350 that operates to carry out the function of process 200 employing a searching and indexing engine 219 and scoring engine 221. Referring to FIG. 1 computer system 100 serves provide the components for the functional system components and processes illustrated in FIG. 3. A user of the system 350 creates 251 the electronic claim file 211 and 212 from files 205 and 206 as previously described in reference to FIG. 2c and FIG. 2f. The file 205 and 206 are translated 211 and formatted 307 and made accessible through various media 355. The claim file 205 and 206 are also provided in electronic claim file 211 form to the search and indexing engine 219 where they will be analyzed regarding whether they contain certain terms, phrases and concepts that have been stored in the dictionary and made available to the search and indexing engine 219 for execution. Additional N-Gram statistics are generated for later iterations and research.

The indexing engine 219 includes a process that creates a data linkage or trace across all the electronic file data to highlight which terms and phrases were found in which document. The process 200 then points to every occurrence of a salient phrase in the set of documents, and creates statistics, at the claim level, of the ratio of terms found in a total number of cases processed to the terms found in claims with specific subrogation activities. Phrases in the dictionary of phrases then point through the traces to the claims in which they occur and link them to concepts that are indicative of a subrogation claim as more fully described in reference to FIG. 7. When groups of concepts mutually show a pattern of found or not found for scoring purposes, these same traces or pointers are used to route the information to the review process.

Components that may be related to matters outside the particular accident giving rise to the subrogation claim such as legal issues (e.g. whether contributory negligence applies, statutes of limitations, jurisdictional requirements) found in the file are also stripped for electronic claim file event messaging 357. The electronic claim file event messaging represents information that might not be parsed into terms, phrases and concepts but in nonetheless pertinent to scoring the files potential for collection, such as a triggering event for notifying the engine to score a claim. Certain of this information may override an otherwise favorable score as determined by terms, words and phrases, because it may preclude collection based upon a positive law or a contractual waiver of subrogation rights. The event messaging 357 is provided to the scoring engine 221 (FIG. 2b). Scoring engine 221 stores and accesses salient content and terms or phrases related to subrogation in a subrogation phrase file 359. Referring again to FIG. 2f, data model 250, data grouping 260 refers to a grouping of recognizable items within a scorable item 262. Scorable item 262 refers to an item, such as found in subrogation case 201, for which scoring can be tallied, and for which referral is a possibility. Scoring engine 211 performs the process that determines scorable item 262. Contents, terms or phrases that may match later analyzed electronic claim files are stored in an electronic claim file index database 361 and storage 353. The electronic claim file index 361 may be formatted 307 for outputs 355. The electronic claim file scoring engine 221 (FIG. 2b) also performs data grouping as previously addressed in connection with FIG. 2f, data grouping 260 to creates pattern vectors 363 and related scores 366 used to determine whether a subrogation file has potential for collection. The results are then reported, through an event message generated to the routing engine 365, where at least one routing 245 (FIG. 2a) updates a threshold and routing parameters database 367. The threshold and routing parameters are used to determine if a particular pattern vector and associated score are referred for collection. Also, routing 245 (FIG. 2a) creates a referable item 369, where applicable.

The present invention employs boosting by incorporating one or more of the techniques as shown in FIG. 4a, $401(a_1-k)$ in ways that incrementally add confidence to an unstructured textual data classification. In some instances multiple classification techniques are required for complex outputs or certain natural language parsing. In other instances, stages of classification can have an accuracy as poor as or slightly better than chance, which chance may be improved by an additional technique. Indexing and searching unstructured textual data as previously describe in reference to process 200 (FIG. 2a) and system 350 (FIG. 3) may utilize one or more techniques or regimes, which include but are not limited to exact match on a word 401($a_1$); exact match on a phrase 401($a_2$); Levenshtein on a word 401(b); Levenshtein match on a phrase 401(c); Boolean queries 401(d); wildcard queries 401(e); synonym matches 401(f); support of soundex 401(g); span queries 401(h); range queries 401(i); categorization based on word/phrase frequency 401(j) and parts of speech processing 401(k). The use of more than one regime is referred to as boosting. In general, these techniques are well known to those skilled in the art of software programming for data mining and text mining. As is indicated herein one embodiment of the present invention incorporates one or more of the foregoing techniques in novel ways.

The regimes 401($a_1$-k) are employed depending upon their efficacy to classify certain types of unstructured textual electronic data patterns. In one non-limiting embodiment the invention employs more than one regime to analyze an unstructured textual data input. In such instances, a logical decision making based upon a decision tree or logical operators such as "equal to", "greater than" or "less than" determines the class of unstructured textual data. In a decision tree regime, logical "If, Then and Else" statements familiar to software programmers are used to direct the decision making based upon certain data indicated by the file. A simple decision point may test whether the "statute of limitations has run" and "if it has run, then terminate further efforts to classify, else continue to the next decision point." Similarly logical operators may test whether the "statute of limitations has run" by testing whether the present date exceeds the time period prescribed by the particular jurisdictions statute of limitation: "if the time period is equal to or greater than X, then terminate further efforts to classify, else continue to the next decision point." In another non-limiting embodiment of the invention a more complex analysis uses a statistical analysis or regression analysis where a statistic proves or disproves a null hypothesis regarding the best class to include the unstructured textual data. Furthermore, by way of one non-limiting example, if one regime 401($a_1$-k) is better than another regime 401($a_1$-k) in a specific unstructured textual data, then the system may be configured not to use the poorer regime, but the categorical finding (such as the expiration of the statute of limitations) from the regime having the greatest ability to correctly categorize. Alternatively, the system may employ all regimes 401($a_1$-k) and if they differ in classification output, then a majority decision making method labels the unstructured textual data as belonging to a predefined class.

The process 200 of FIG. 2a, FIG. 2b and system of FIG. 3 utilizes the taxonomy engine 215, and/or the inference engine 217 and/or the indexing and extraction engine 219 to automatically process the techniques listed in FIG. 4a to classify subrogation information into groups that will support an analysis as to their subrogation saliency. When more than one unstructured textual data classifier is utilized the steps used to effectuate labeling are: (1) using multiple classifiers using the same datasets; (2) using the majority voting as a classifier; (3) using a set of different classifiers, each specialized for different features of the data set.

In one embodiment of the present invention, a user predetermines the classification of an unstructured data set in advance of the analysis performed by one or more of the regimes 401($a_1$-k). Recall, that the concepts, terminology and relationships of an ontology are relevant within a specific semantic context 267 (FIG. 2f). Additionally, ontology element 272 (FIG. 2f) provides a semantic context for taxonomy element 271. Having determined the domain and the classification, the regime utilized to develop the taxonomy and the ontology requires mapping h: X—>Y using labeled training examples ($x_1,y_1$), ..., ($x_n, y_n$). The process utilizes one or more regimes 401($a_1$-k) iteratively, capturing more of what is being missed, and reducing false positives with more recently discovered features, smarter text retrieval, or expanding to other techniques. This process is heuristic employing: (a) taxonomy augmentation; (b) suggested synonyms [thesaurus book and web]); or (c) refining work on N-Grams to pull more 'signal' into a feature, concept or term (taking a 3-Gram to a more segmented subset of 4-Grams or 5-Grams having a higher relevancy of selected terms). Relevancy is related to the probability of collection by virtue of the score.

Figure 4B:
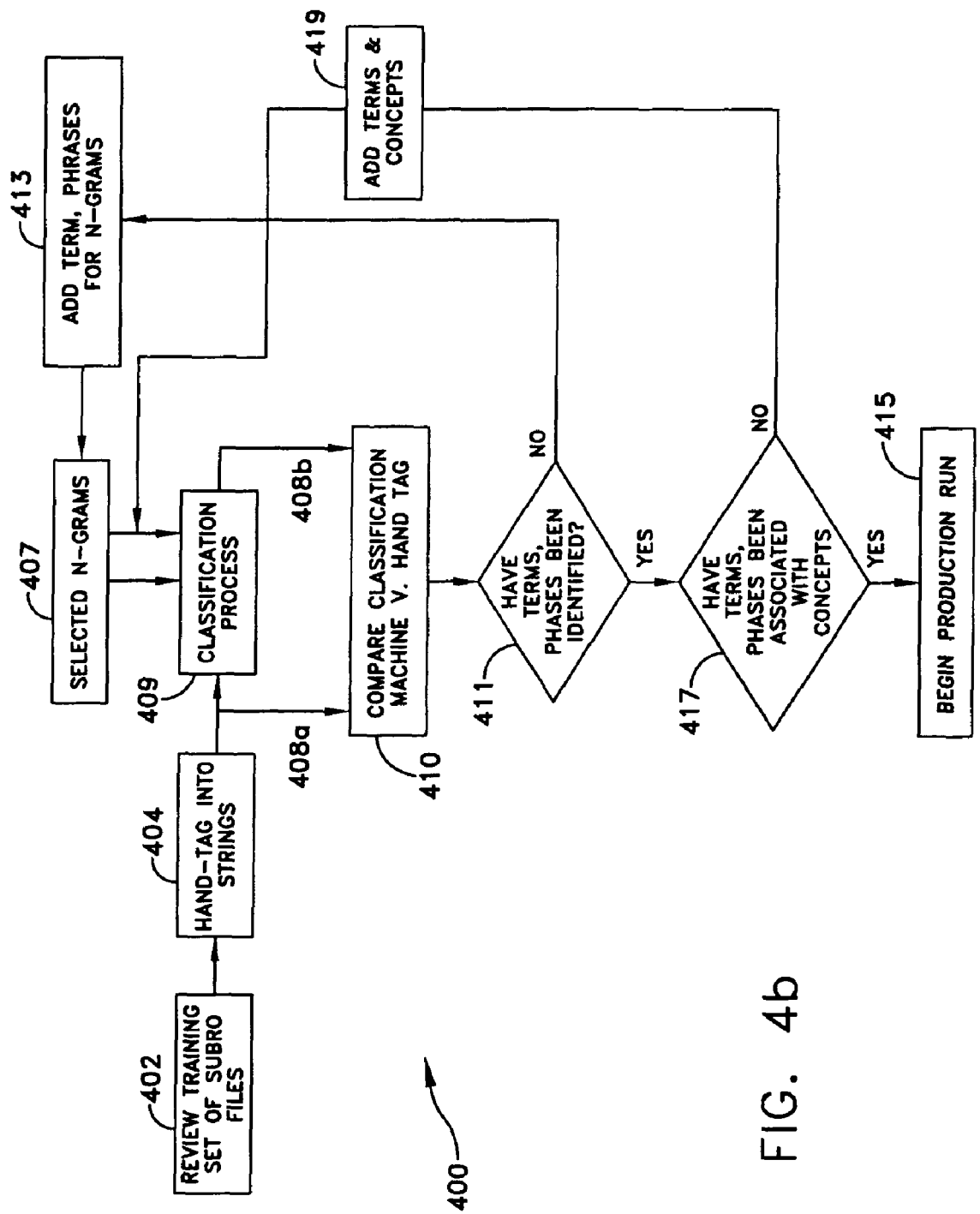
FIG. 4b is a flow chart of a method of operation of one embodiment of the present invention.

FIG. 4b refers to a computer coded process 400 for establishing the concepts, terms and phrases for classifying subrogation files. A user reviews a file 402 from known subrogation files, also referred to as a training set, having structured text and unstructured text for purposes of establishing the concepts, terms and phrases that under the regimes 401($a_1$-k) best classifies a set of subrogation files. The data that the user considers most useful (for example, what role the insured vehicle played in an accident), is hand tagged 404 and digitally transformed into an electronic data record representing one or more categories of salient information pertinent to whether a subrogation claim has a potential for recovery by a collecting agency, such as law firm, an insurance company or other recovery specialist. Classification process 409 embodies the data model 250 in sorting the electronic data record into one or more categories relevant to the associated files subrogation collect ability. Process 409 performs an analysis of the electronic records using one or more of the techniques 401($a_1$-k).

By way of a non-limiting example, the electronic data record from the training set is submitted to classification process utilizing N-Gram techniques 401($a_1$), 401($a_2$) and the Levenshtein technique 401(c). The results of the classification process 409 include a comparison step 410 where newly classified files 408b (actually a subset of the training files) are compared against the actual files 408a producing the classification. The comparison step 410 in combination with decision step 411 determines if the selected classification process utilizing 401($a_1$), 401($a_2$) and 401(c) efficiently classified the hand tagged text 404. The comparison may be done manually or by coding the subset of the training files as in advance of the classification so that its class is determined a priori. If the selected N-Grams 407 efficiently classified the hand tagged text 404 of the subset of the training files, then process 400 is used with the selected N-Grams to classify non training or production files into subrogation classes for eventual referral to collection. If it is determined during the comparison step 410 and decision step 411 that a requisite level of accuracy has not been achieved then the process 400 adds N-Grams 413 to improve performance. Adding more terms and phrases has the effect of generally improving performance of process 400 in correctly classifying a file. In the event additional terms are required the process 409 incorporates the change either in the degree of N-Gram or other parameters to obtain a more accurate classification. The steps comprising process 409, 410 and 411 continue until the error between a classification and a defined accuracy level reached a predefined limit, e.g., until existing data is depleted or a fixed project time has been exhausted. After establishing weights or the rules for a set of subrogation claims the rules as embodied in the classification process utilizing $401(a_1)$, $401(a_2)$ and $401(c)$ are accessed to classify an unknown set of documents.

In addition to utilizing $401(a_1)$, $401(a_2)$ and $401(c)$ as indicated during the training phase, process 400 also establishes a lexicon of synonyms that relate to subrogation claim concepts. For example, the terms such as "owner hit" or "other vehicle rear ended" are words (referred to as synonyms) with a close association to the concept of "liability". Each separate and distinct concept forms one element in a vector as described more fully in reference to FIG. 7. Many synonyms may relate to a single concept and identified by at least one element in the concept vector. A subrogation file's synonyms that are also contained in the assembled list are compared against the one element in the vector to determine whether the subrogation file contains the stored concept element; and if the subrogation file contains the concept element the occurrence is flagged by classification process 409. In assessing whether a sufficient reliability in flagging concepts has been achieved the process 400 employs the classification process 409 to test a subset 408a of the files. The comparison may be done manually or by coding the subset of the training files as in advance of the classification so that its class is determined a priori. If the subset is flagged then the level of reliability is attained and if the files 408a are not properly flagged, then synonyms and corresponding concepts may be added 419 until a requisite reliability is established. Decision step 417 determines if the training set and the subset has been flagged. If both decision step 411 and decision step 417 are satisfied, then the process 400 is deemed available for processing to begin a production run 415 in a production setting.

Figure 4C:
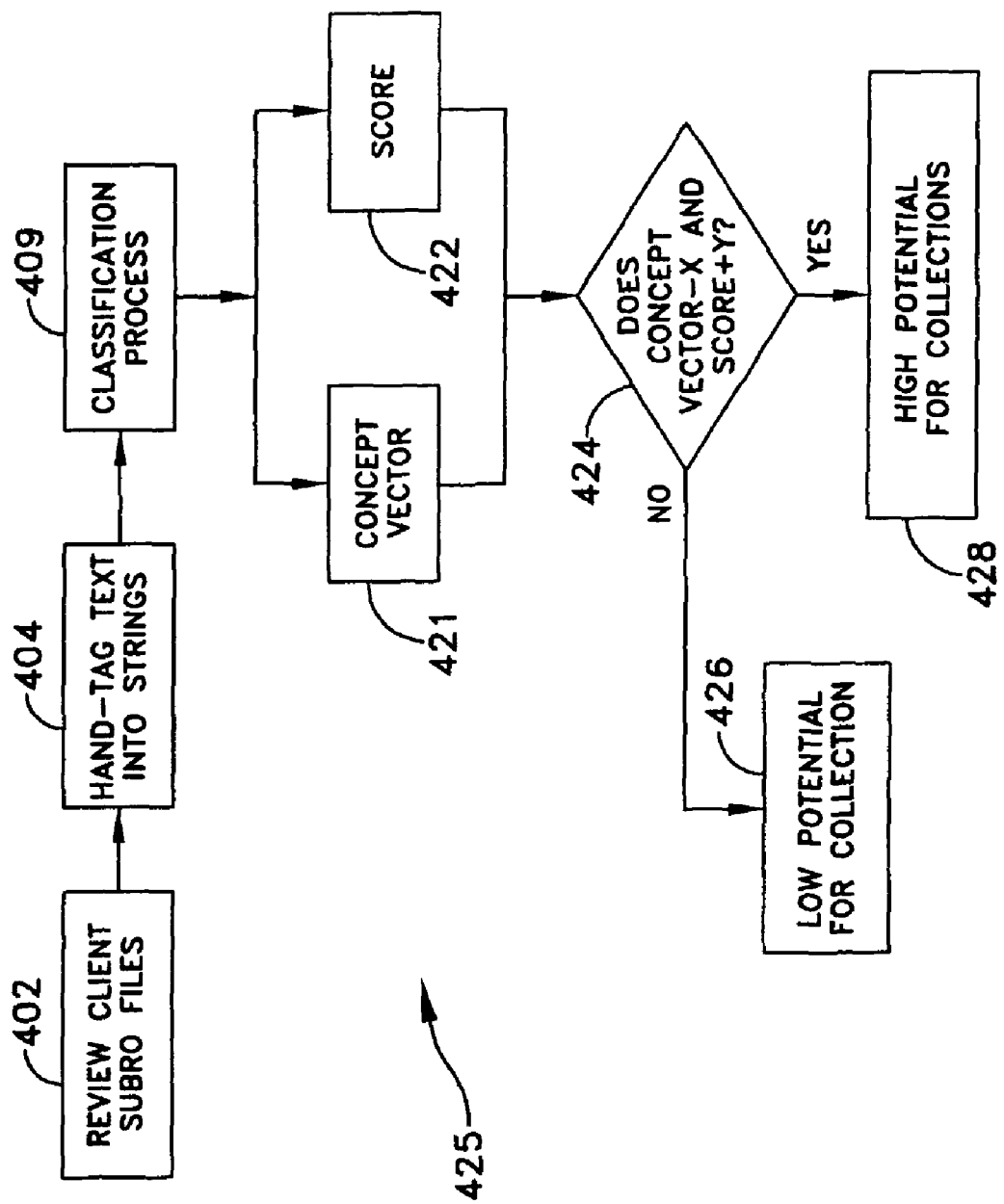
FIG. 4c is a flow chart of a method of operation of one embodiment of the present invention.

Referring now also to FIG. 4c, in a non-limiting embodiment of the invention the production phase of sorting high and low potential subrogation files utilizes a computer coded process 425, which in some regards is similar to process 400. Process 425 predicts a classification based on the rules created during training phase process 400. A user reviews a file 402 from known subrogation files having structured text and unstructured text for purposes of establishing the concepts, terms and phrases that under the regimes $401(a_1\text{-}k)$ best classifies a class of subrogation files.

By way of a non-limiting example illustrated in FIG. 4c a classification process 425 manually prepares file data and then enters the data electronically to digitally transform the data into an electronic data record representing one or more categories of salient information pertinent to whether a subrogation claim has a potential for recovery by a collecting agency, such as law firm, an insurance company or other recovery specialist. The user reviews 402 one or more client subrogation files and hand-tags 404 data found in the files considered beneficial to a classification to discern if the file should be prosecuted for collection. By way of a non-limiting example, the process 409 submits the electronic data record to a classification process utilizing N-Gram techniques $401(a_1)$, $401(a_2)$ and the Levenshtein technique $401(c)$ as described in reference to FIG. 4a and FIG. 4b. During the training phase as described in reference to FIG. 4b, classification process also developed concept vectors, that associate certain term and phases and their associated synonyms with subrogation concepts as earlier described. The results of the classification process 409 creates a concept vector pattern 421 and a score 422. Classification process 409, score 422 embody the data model 250 in sorting the electronic data record into one or more categories relevant to the associated files subrogation collect ability. The concept vector pattern 421 denotes that the file contains certain salient terms beneficial to a classification to discern if the file should be prosecuted for collection.

Based upon the concepts, terms, thresholds and rules relative to the saliency to the subrogation claim a score 422 is generated. The combination of concept vector pattern 421 and score 422 are tested 424 utilizing in the case of the concept 421 a predetermined mask and the case of the score 422 a threshold (each more fully described below). The test is used to determine if the file has a low potential 426 for collection or a high potential 428 for collection.

This stage of the process 425 ends when a preset time expires, as might be determined by client driven expectations or where the process has no further data to process. Then, as in many decision support approaches, the process collects feedback from collection lifecycle to tune, adapt, and improve the classification via process 400 over time.

Figure 4D:
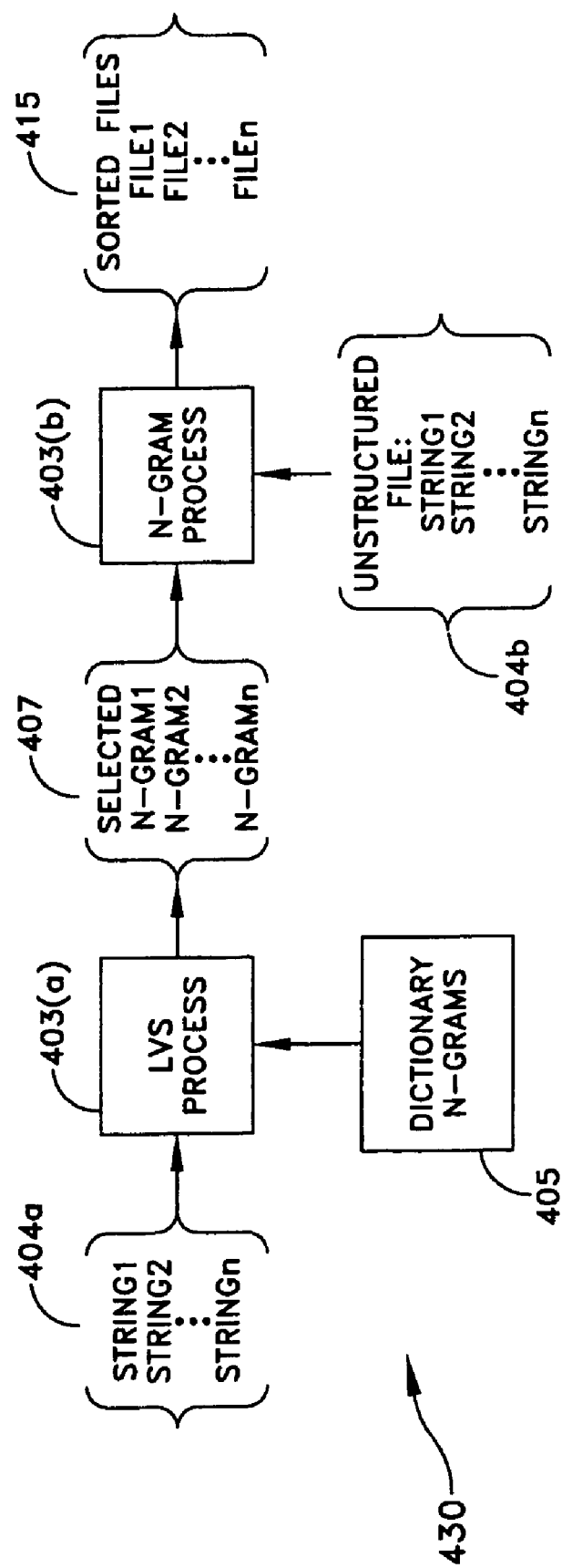
FIG. 4d is a flow chart of a method of operation of one embodiment of the present invention.

FIG. 4d illustrates a process 430 of creating the parameters for the classification process 409 utilized in one embodiment of the present invention by processes 400 and 425. The process 430 by way of a non-limiting example employs N-Gram and Levenshtein rules particularly from known representative subrogation files. Once developed, the rules are employed subsequently to classify subrogation files with various degrees of subrogation collection potential. One non-limiting embodiment of the present invention utilizes two regimes $403(a)$ and $403(b)$ configured to model algorithms to classify, categorize and weigh data indicative of two or more classes of unstructured textual electronic data patterns such as found in insurance subrogation files or constructs thereof.

Referring again to FIG. 4b and FIG. 4c a review of client subrogation files 402 and subsequent hand-tagging 404 forms a series of informational strings. The collection of string terms 404a, are processed to sort out strings, which are near matches with and without a small number of misspellings. The initial processing of string terms 404a is performed by a Levenshtein process $403(a)$ to determine a Levenshtein edit distance using a software coded algorithm to produce a metric well known in the art of programming data mining and text mining applications. The edit distance finds strings with similar characters. The Levenshtein processor locates N-Grams in the dictionary 405 that nearly matches or identically match strings 404a that might be gainfully employed in a subsequent N-Gram process $403(b)$. The context of the returned set of data requires a review and a labeling activity, after which it is submitted to process 400 to fully capture each feature used in each informational model. The process 430 proceeds as follows:

Determining if the strings have a corresponding N-Gram utilizing a Levenshtein process $403(a)$ that receives a string 404a (i.e. a non denominated string of symbols in the form of letters, words, and phrases) as an argument in a first step.

Searching the dictionary 405 of all N-Grams at the byte level utilizing the Levenshtein process 403 and computing the edit distance between target string and a master list of terms.

Sending selected N-Grams 407 to the N-Gram process 403 and utilizing the selected N-Grams 407 to analyze the chosen strings 404b to determine provisionally if the related subrogation files can be successfully sorted into one or more classes of files having subrogation potentials. 808 records are created of the kind exemplified by records 205 and 206. Row 1 element 503 by way of example illustrates the phrase "IV HIT" which means "insured vehicle hit" as may appear in the record 205 or record 206. The application of a 2-Gram algorithm detects the occurrence of this phrase or pair of words in either the record 205 or record 206 and increments the total displayed as 3,663 in Row 1 element 505. Row element 507 indicates 9,145 records remain unclassified. Row element 510 indicates that 28.599931% has been identified as belonging to the subrogation prior referred class.

On the assumption that the error or inability to classify to a predefined accuracy level have not been reached then process 400 as indicated by step 413 adds N-Grams by increasing the N-Gram width by one unit or to a 3-Gram including the phrase "IV HIT BY" which means "insured vehicle hit by" as may appear in the record 205 or record 206. The application of a 3-Gram algorithm detects the occurrence of this phrase or trio of words in either the record 205 or record 206 and increments the total displayed as 696 in Row 2 element 511. Row element 513 indicates 1,289 records remain unclassified out of the total of 1985 shown in Row element 515. Row element 517 indicates that 35.06297% has been identified as belonging to the subrogation prior referred class.

On the assumption that the error or inability to classify to a predefined accuracy level has not been reached then process 400 increases the N-Gram width by one unit or to a 4-Gram including the phrase "IV HIT BY OV" which means "insured vehicle hit by other vehicle" as may appear in the record 205 or record 206. The application of a 4-Gram algorithm detects the occurrence of this phrase or quadruple of words in either the record 205 or record 206 and increments the total displayed as 505 in Row 3 element 519. Row element 520 indicates 180 records remain unclassified out of the total of 685 shown in Row element 521. Row element 522 indicates that 73.72263% has been identified as belonging to the subrogation class.

Row 4 through row 20 similarly utilize various N-Grams to detect the occurrence of phrases in either the record 205 or record 206 and process 400 increments the total displayed accordingly. Column 523 elements indicate records previously Optionally performing a Naives Bayses analysis on related subrogation files to form a subclass of high potential one or more classes of files having subrogation potentials.

In creating the taxonomy elements 266, as refer to FIG. 2f, processes 400, 425 and 430 utilize the Levenshtein algorithm of 403(*a*) to find candidate synonyms by for example: (1) searching the term "IV HIT BY OV" (where IV refers to an insured vehicle and OV refers to the other vehicle) and using an edit distance metric of less than 5 to obtain a set of candidate N-grams; and (2) Supervises a process of assigning the new terms to the HIT_IV variable (see column below marked Flag below).

| Find_N-Gram | N-Gram | Edit distance | Flag |
|---|---|---|---|
| IV HIT BY OV | IV HIT BY CV | 1 | Hit_IV |
| IV HIT BY OV | HIT BY OV | 3 | Hit_IV |
| IV HIT BY OV | WAS HIT BY OV | 3 | Hit_IV |
| IV HIT BY OV | IV HIT OV | 3 | not |
| IV HIT BY OV | IV R/E BY OV | 3 | Hit_IV |
| IV HIT BY OV | IV HIT THE OV | 3 | not |
| IV HIT BY OV | OV HIT IV OV | 3 | Hit_IV |
| IV HIT BY OV | IV HIT CV CV | 3 | not |
| IV HIT BY OV | IV HIT CV IV | 3 | not |
| IV HIT BY OV | WHEN HIT BY OV | 4 | Hit_IV |
| IV HIT BY OV | OV HIT IV ON | 4 | Hit_IV |
| IV HIT BY OV | IV WAS HIT BY OV | 4 | Hit_IV |
| IV HIT BY OV | IV HIT OV IN | 4 | not |
| IV HIT BY OV | IV R/E BY CV | 4 | Hit_IV |
| IV HIT BY OV | IV RE BY CV | 4 | Hit_IV |
| IV HIT BY OV | WAS HIT BY CV | 4 | Hit_IV |
| IV HIT BY OV | IV HIT THE CV | 4 | not |

One aspect of the invention herein described is a feature that permits the calculation of a score such as described in reference 422 in FIG. 4c, and in reference to the scorable item 262 in FIG. 2f, which factors into the decision to sort a file into a given category of potential subrogation collection. FIG. 5 by way of example and not limitation shows a table of N-Gram results from process 400, process 425 or the data model 250 utilizing multiple files of the type exemplified by FIG. 2a case file 201 from which 12, classified to the subrogation class. The remaining out of the total are shown in column element 525. Column 527 indicates the total records for that N-Gram. Column 529 indicates the percentage that has been identified as belonging to the subrogation class.

Referring again to FIG. 5, Item 527 sums to 823 when all classes of 5-Gram beginning with the 3-Gram "IV HIT BY" are included (Note, N-grams with fewer than 10 observations were omitted). Item 523 represents the existing status of claims 'already in subro'. Column 523 (and the number in "# in subro" block 505) therefore represents the number of files that have been already tagged as subrogation prior to being subjected to the N-Gram process that generated the table in FIG. 5. These files serve as an example of historical activity. The percentage likelihood 529 serves as an indication of a potential the associated term, phrase or N-Gram provides for subrogation opportunity. As terms are grouped together as previously addressed in connection with FIG. 2f, data grouping 260, these percentages are referred to as scores. The scorable item 262 FIG. 2f refers to an item, such as found in subrogation case 201, for which a score can be tallied, and for which referral is a possibility. The "remains" column 525 represents the claims available to be sent for further investigation for subrogation opportunity. Not all claims available to be sent will be use to achieve a file score because additional concepts or features may indicate information that deems subrogation as not possible (e.g. other vehicle fled the accident scene and is unknown). The "remains" are those files that have been determined to include the N-Grams listed. For example the N-Gram "IV HIT" produced remains 507 totaling 9,145. As a practical matter only claim files that also show specified score or percentage likelihood 529 are referred for follow up. The process 400 groups N-Grams of similar scores. In FIG. 5 by way of example and not limitation Rows 4 and 16-20 are set to a Negative Flag (Unknown Other Party). These may present a difficult subrogation case to prosecute. Rows 5-15 are set to a Positive Flag [IV hit by OV]. In this instance the user has a potential to recover a subrogation case if it can further determine who OV is and then determine if OV is at fault.

In some instances the use of N-Gram analysis produces redundancy. For example, Row 3, can be used in lieu of 6-14, as it spans the other phrases as a 4-Gram within the 5-Grams. Rows 5 and 15 are synonymous and are often binned into the set of terms for HIT_IV. As the process 400 continues it groups additional N-Grams which are synonyms to the text concept into variables which are then used in the modeling process. Typically, the features/flags are constructed with the purpose of trying to point out why the accident occurred (proximate cause) to establish liability for the subrogation process. Patterns with high historical success also have a high potential for future relevance, including the referral of those files "remaining" to be classified (e.g. if updated, item 525 would be all zero, and item 527 would be the same as 523 for rows 5-15). This information is then stored in the application so that as new claims are presented and scanned for patterns they are scored and sorted for making new referrals.

Other flags are connected to HIT_IV to improve precision or to explain why a claim in item 525 should not be sent for review (e.g. insured ran red light and IV hit by OV). This use of mutual information allows simple N-Gram construction to summarize additional matters present in the case.

As indicated above, the classification process also may include the step of performing a Naives Bayses analysis on the string and a list of terms found in a subrogation files to form a subclass of high potential one or more classes of files having subrogation potentials. Under a Naïve Bayes rule, attributes (such as an N-Gram or its hash value) are assumed to be conditionally independent by the classifier in determining a label (Insured vehicle, no insured vehicle, left turn, no left turn). This conditional independence can be assumed to be a complete conditional independence. Alternatively, the complete conditional independence assumption can be relaxed to optimize classifier accuracy or further other design criteria. Thus, a classifier includes, but is not limited to, a Naïve Bayes classifier assuming complete conditional independence. "Conditional probability" of each label value for a respective attribute value is the conditional probability that a random record chosen only from records with a given label value takes the attribute value. The "prior probability" of a label value is the proportion of records having the label value in the original data (training set). The "posterior probability" is the expected distribution of label values given the combination of selected attribute value(s). The Naives Bayses algorithm is well known in the art of programming data mining application.

In one embodiment of the present invention, the Naive Bayes statistic is used for both N-gram selection and for scoring features and cases. The basic statistic is simply the ratio of the number of times an N-Gram is mentioned in a subrogation claims to the total times it was mentioned in all claims. In process 200 (FIG. 2a) the Naïve Bayes process may be combined with the N-Gram models and applied at the informational modeling level to accumulate features into sets to fulfill a case strategy for capturing high potential subrogation claims. Process 213 utilizes callable software functions to create Naïve Bayes scores for N-Grams and to find near spellings of certain pre-selected phrases in the text of the unstructured data. N-Gram models rely on the likelihood of sequences of words, such as word pairs (in the case of bi-grams) or word triples (in the case of tri-grams, and so on to higher numbers).

Variables used in a Naïve Bayes models are contingent on the case being modeled as well as any macro level pre-screening such as: 1) Subro ruled out in the notes; 2) subro="Yes" in the notes; 3) insured liability set to 100% in any clients % liability tracking field; 4) insured liability set to 100% or clearly at fault in the text; 5) insured involved in a single vehicle accident (no one else involved); 6) insured Hit and Run with no witnesses; 7) insured in a crash where other vehicle fled and left the scene as unknown with no witnesses; 8) insured hit own other vehicle; 9) both vehicles insured by same carrier; 10) insured going third party for damages; 11) other party carrier accepting liability in the notes (e.g. "Good case if we paid any collision"); 12) insured hit while parked and unoccupied with no witnesses.

By way of example for auto subrogation similar ideas and processes model features on a case by case basis: 1) Rear-ender; 2) Left turn; 3) Right turn; 4) Other turn; 5) Change Lane, Merging, Pulling out, pulling from, exiting, cutting off, swerving, crossing; 5) Parking lot; 6) Backing; 7) Violation.

Issues combine "who was performing a particular act" (directionality of Noun Verb Noun N-Gram Logic with modifiers). By way of example and not limitation: (a) IV RE OV (where RE refers to rear ended); (b) IV RE BY OV. The system deals with conditional Naive Bayes additional features such as: (c) OV PULLED OUT IN FRONT OF IV AND IV RE OV.

This foregoing approach applies to other applications as by way of example and not limitation with the generic as 'good' and then improving the discrimination by selecting the exceptions to the generic for better capturing historical collection cases. In one embodiment a process step fine-tunes the N-Grams and the features in the Naive Bayes modeling process to improve the segmented case base reasoning targets.

Figure 6:
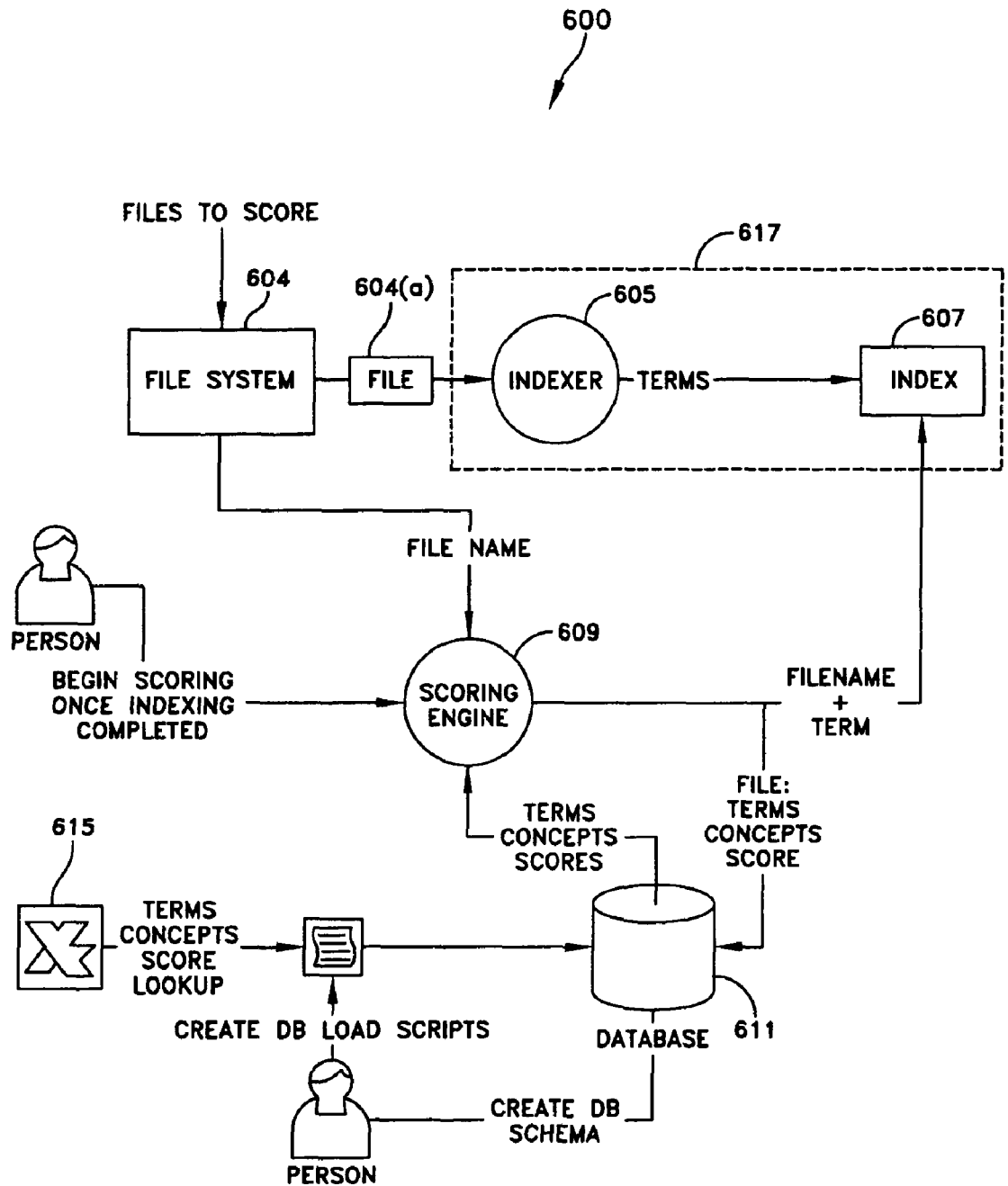
FIG. 6 is a block diagram of a system illustrating one embodiment of the present invention.

FIG. 6 represents one embodiment of the present invention wherein a system 600, is coded to carry out the function of process 200, 400, 425, 430 as incorporated into data model 250 utilizing a searching and indexing engine 617 and scoring engine 609. The system 600 may be embodied in computer system 100 wherein a file system 604 is essentially included in database server 150 database, database server 170 database for electronic claim files that serve as input file 604a to the search and indexing engine 617 that may reside on server 140; a database server 150, 170 databases stores concepts and term data created from a classification process for uploading to the scoring engine 609 that may reside on server 140; the search and indexing engine 617 may also reside in server 140; and an indexer utilizing at least one database server 150, 170 databases to store groups of synonyms each associated with a single concept.

The user of the system 600 creates records from the claim file 205 and 206 and stores the files in a file system 604. The electronic claim files such as claim file 616 (a) serve as input to the search and indexing engine 617. Concept and term data 615 representing from FIG. 2f the transformation rules 256 and the taxonomy 266 as created from information representing encyclopedic like reference material, such as statutes of limitation, jurisdiction, laws of negligence, insurance laws; and (2) information representing words and phrases from archetypical subrogation files, developed from human resources or from processes 400 and 401 is stored in database 611 for eventual uploading to a scoring engine 609. The scoring engine 609 stores salient content and terms or phrases related to subrogation in a subrogation phrase file such as phrase file 359 in FIG. 3. Content, term or phrases that match the claim files such as claim file 616 are indexed by indexer 605 and stored in the index 607, which comprise the indexing engine 617 index database such as earlier referred to database servers 150 or 170 databases in FIG. 1 or 223 in FIG. 2.

Figure 7:
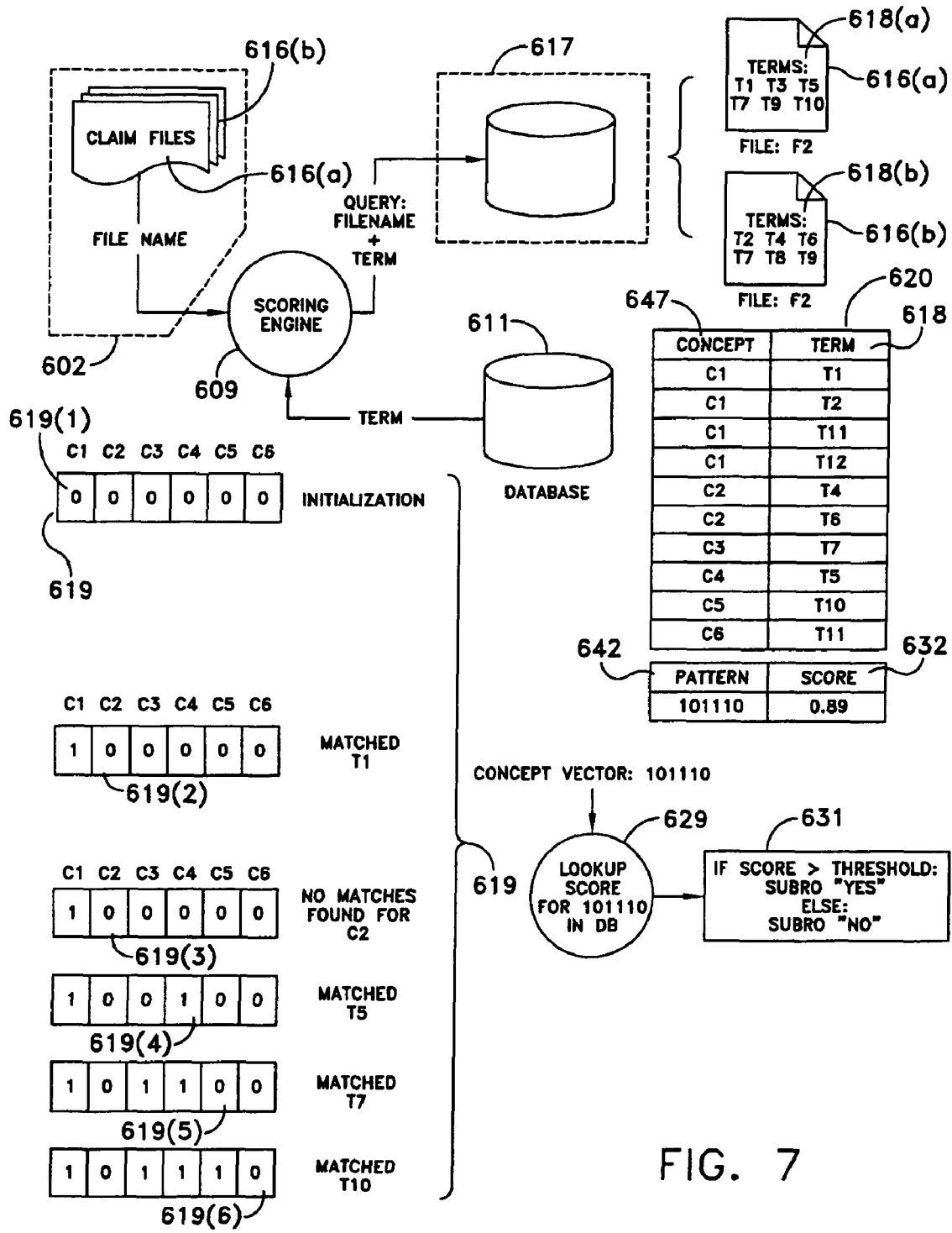
FIG. 7 is a block diagram of a system illustrating one embodiment of the present invention.

In FIG. 7, the indexer 605 uses groups of synonyms referred to as terms 618(a), 618(b) comprising subset data extracted from claim tiles 616(a), 616(b) respectively as determined by way of a non-limiting example of process 200, 400, 425 and 430 and the data model 250 (see, FIG. 2f as "synonyms element inclusion in synonym set" 270 and synonym set 268). The synonyms or terms developed are each associated each with a single concept 647. Therefore multiple synonyms may be associated with one concept as indicated in table 620. Referring to FIG. 2f, essentially system 600, utilizes data model 250 transformation 252 within which a transformation rule 256 and input data 211, 212 is performed. This includes the set of taxonomy elements used for matching against, and the set of formatting, translation, and organization rules used to make the transformation. Transformation 252 applies the rules 256 to translate the input data records 211, 212 to recognizable items 258. Bundles of terms are assigned to a flag (1=found, 0=failed to find). In a data grouping 260, sets of flags are combined in expected patterns. Returning to FIG. 7, each concept 647 forms one element in a row vector illustrated in a first state as concept vector 619 element 619(1). A subrogation file 616a as stored in file system 604 is compared against the first element 619(1) of the concept vector 619 to determine whether file 616a contains the concept element stored in 619(1). If the subrogation file, such as file 616(*a*), contains the first element 619(1) of the concept vector 619 (referred to in FIG. 2*f* as data grouping 260), the event is flagged as shown in a second state concept vector 619. In one embodiment of the invention, once a term has been matched it is not further tested. A third state concept vector 619 indicates that no matches were found in concept element 619(2) for concept C2. In subsequent states concept vector 619 new matches T5, T7 and T10 are found respectively in concept elements 619(4), 619(5) and 619(6). The state of the concept vector 619 having all applicable elements flagged is illustrated as pattern 642.

Referring again to FIG. 2*f*, data model 250, data grouping 260 refers to a grouping of recognizable items within a scorable item 262. Scorable item 262 refers to an item, such as found in subrogation case 201, for which scoring can be tallied, and for which referral is a possibility. In FIG. 7, pattern 642 of the final state of the concept vector 619 has an associated score 632, which is associated with the scorable item 262, each of which is derived from the N-Gram analysis previously described in connection with FIG. 4*c*. The pattern 642 and the score 632 form the parameters for the classification of the subrogation file. The score 632 for the pattern 642 is retrieved from the database 611. The score 632 for the pattern 642 is compared against a pre assigned threshold. If the score 632 is greater then the pre assigned threshold the file 616(*a*) is referred to one of several destinations for potential subrogation claim collection. If the score 632 is below a threshold it is not referred.

It is expressly intended that all combinations of those elements that perform substantially the same function in substantially the same way to achieve the same results are within the scope of the invention. Substitutions of elements from one described embodiment to another are also fully intended and contemplated.

I claim:

1. A computer-implemented method for determining whether a claim has merit to warrant claim recovery, the method comprising:
    describing, using a computer, a set of file documents having data containing a context;
    iterating upon a classification process to create rules that classify the set of documents based upon the context;
    incorporating the rules into a classification schema to classify the claims;
    generating said classification schema using said computer;
    wherein the schema calculates a score and a concept vector to identify the claims that demonstrate a threshold probability for recovery.

2. A computer-implemented method for determining whether a claim has merit to warrant claim recovery, the method comprising:
    describing, using a computer, a set of documents having unstructured and structured file data containing terms and phrases having one or more contextual bases;
    transforming the terms and phrases for iterating upon a classification process to create rules that classify the set of documents based upon the context;
    incorporating the rules into classification schema to classify the claims;
    generating said classification schema using said computer;
    wherein the schema calculates at least one score and one or more concept vectors to identify the claims that demonstrate a threshold probability for recovery.

3. The method of claim 2 wherein the step of transforming includes using a template for parsing the terms and phrases into an electronic data stream.

4. The method of claim 2 wherein the classification process includes the step of incorporating one or more of a rule induction and knowledge representation, thesauri and taxonomy and a text summarization derived from the set of documents.

5. The method of claim 2 including the step of routing the set of documents.

6. The method of claim 2 including the step of processing a first phase where representative subrogation files serve as test cases to establish the parameters and rules and a production process phase wherein files are classified according to score, a concept vector and a threshold probability of subrogation recovery.

7. The method of claim 2 including the step of processing a first phase having representative insurance files comprising information related to an accident.

8. The method of claim 7 wherein the information related to an accident includes one of a file number, a payment indication, medical payments, indemnity payments, expense payments, amounts reserved, progress notes and task diaries, correspondence, transcriptions, recorded statements, photos, and physical evidence.

9. The method of claim 2 wherein the step of processing unstructured data includes utilizing an N-Gram analysis.

10. The method of claim 4 wherein the step of processing unstructured data includes utilizing a keyword process to flag terms to be applied to a classification analysis.

11. A computer program product embodied in a computer readable medium for determining whether an insurance claims has merit to warrant claim recovery comprising:
    code for causing a computer to partially describing a set of documents having unstructured and structured file data containing terms and phrases having contextual bases;
    code for causing a computer to transform the terms and phrases; code for iterating a classification process to determine rules that classify the set of documents based upon context;
    code for causing a computer to incorporate the rules into one or more or an induction and knowledge representation; thesauri taxonomy and text summarization to classify claims;
    code for causing a computer to calculate a score and a concept vector to identify the selected claims that demonstrate a threshold probability of recovery.

12. A computer system for determining whether a claim has merit to warrant claim recovery comprising:
    a computer implemented means for describing a set of documents containing terms and phrases having contextual bases; a means for transforming the terms and phrases;
    a computer implemented means for iterating a classification process to determine rules that best classify the set of documents based upon context;
    a computer implemented means for incorporating the rules into an induction and knowledge representation;
    a thesauri taxonomy and a text summarization to classify claims;
    a computer implemented means for calculating a base score and one or more concept vectors to identify the selected claims that demonstrate a given probability of recovery.

13. The computer system of claim 12 further comprising one or more means for matching on a term or phrase utilizing an N-Gram process; means for finding terms or phrases within a Levenshtein edit distance; wildcard queries; synonym matches; soundex; span queries; range queries; Naïve Bayes; categorization based on term and phrase frequency and parts of speech.

14. The computer system of claim 12 further comprising one or more of means for one of a statistical analysis or regression analysis where a statistic proves or disproves a null hypothesis regarding a class in which to include the unstructured textual data.

15. The computer system of claim 12 further wherein the claim is an insurance claim.

16. A computer process for sorting files into one or more categories comprising:
   analyzing, under control of a computer, associated electronic records utilizing at least one N-Gram technique and at least one Levenshtein technique to sort other associated data records into one or more categories;
   producing, using a computer, a score, a concept vector and a threshold that classifies the files into collection strategies.

17. The computer process of claim 16 further comprising the further step of determining that a level of accuracy has not been achieved and adding N-Grams to improve classification performance.

18. The computer process of claim 16 comprising the further step of assessing the accuracy of classification until an assigned error between a classification and a defined accuracy level is achieved.

19. The computer process of claim 16 comprising the further step of indexing terms and phrases found in a file.

20. The computer process of claim 16 comprising the further step of searching a dictionary of all N-Grams by computing the edit distance between one of a string and a list of terms found in a file.

21. The computer process of claim 20 comprising the further step of performing a Naives Bayses analysis on one of the string and a list of terms found in a insurance file to form a subclass of high potential one or more classes of files having collection potentials.

22. A computer system for determining whether a claim has merit to warrant claim recovery comprising:
   a file system for electronic claim files to serve as input to a search and indexing engine;
   a database for concepts and term data created from a classification process for uploading to a scoring engine;
   an indexer having at least one index database to store groups of synonyms each associated with a concept wherein: (1) each concept forms an element in a vector; and (2) a file stored in the file system is compared against the elements of the vector to determine whether the file contains the stored concept element; and (3) if the file contains an element of the concept vector the event is flagged.

23. A computer process for determining whether a claim has merit to warrant recovery comprising:
   inputting electronic claim files to a search and indexing engine controlled by a computer;
   creating a dictionary of term data having synonyms relating to the claim files and uploading the data to a scoring engine associated with a computer;
   storing at least one database of the synonyms each associated with one or more concepts wherein: (1) one or more concept form into an element in a vector; (2) a claim file database of the synonyms is compared against the elements of the vector to determine whether the file contains the stored concept element.

24. The computer process of claim 23 wherein if the file contains one of an element of the concept vector or a business rule it is not further tested.

25. The computer process of claim 23 wherein a score derived from an N-Gram analysis forms an element for deciding if a claim ahs merit to warrant claim recovery efforts.

26. The computer process of claim 25 wherein each concept contained in a vector forms a pattern.

27. The computer process of claim 26 wherein each pattern forms an element for deciding if a claim has merit to warrant claim recovery efforts.

28. The computer process of claim 25 wherein the score and the pattern is compared against a pre assigned threshold.

29. The computer process of claim 25 wherein the score and the pattern is compared against a pre assigned threshold and if the score is greater then the pre assigned threshold the file is referred to one or more destinations.

30. The computer process of claim 25 further including the step of incorporating term data in a dictionary of phrases.

31. The computer process of claim 26 further including the step of pointing through a trace to a claim in which the phrases occur and linking them to the concepts that are indicative of a collection claim.

* * * * *